US007248998B2

(12) United States Patent
De Martini

(10) Patent No.: US 7,248,998 B2
(45) Date of Patent: Jul. 24, 2007

(54) METHOD AND SYSTEM FOR THE STATISTICAL CONTROL OF INDUSTRIAL PROCESSES

(75) Inventor: Daniele De Martini, Via Redipuglia 21, I-16147, Genova (IT) I-1617

(73) Assignee: Daniele De Martini, Genova (IT)

( * ) Notice: Subject to any disclaimer, the term of this patent is extended or adjusted under 35 U.S.C. 154(b) by 0 days.

(21) Appl. No.: 11/146,132

(22) Filed: Jun. 7, 2005

(65) Prior Publication Data

US 2005/0288892 A1    Dec. 29, 2005

(30) Foreign Application Priority Data

Jun. 7, 2004    (IT)    ................. TO2004A0377

(51) Int. Cl.
    *G06F 19/00*    (2006.01)
(52) U.S. Cl. ..................................... 702/182
(58) Field of Classification Search ............ 702/182, 702/179, 181, 35, 36, 136, 132; 700/117, 700/118, 95, 108, 109, 110
    See application file for complete search history.

(56) References Cited

U.S. PATENT DOCUMENTS 6,550,700 B1 *   4/2003   Griebat et al. ................. 241/30

FOREIGN PATENT DOCUMENTS

EP    0 508 386 A    10/1992

\* cited by examiner

*Primary Examiner*—John Barlow
*Assistant Examiner*—Xiuqin Sun
(74) *Attorney, Agent, or Firm*—Sughrue Mion PLLC

(57) ABSTRACT

A method for controlling an industrial process including: producing a pilot sample including n exemplars of the product, acquiring measured data $(X_1, \ldots, X_n)$ for an observed variable relating to that sample having a distribution $F''$ approximating to the unknown F distribution for the observed variable, determining a minimum sample size on which the test is performed such that the lower bound $(\hat{\pi}_F^{\alpha 1_{n,1}}(m))$ for a confidence interval of predetermined level $(1-\alpha l)$ associated with the bootstrap distribution for the pointwise estimate of the power of the test performed on a sample of that size extracted from the pilot sample of distribution $F''$, is equal to or greater than a predetermined desired power value, and producing a sample of products to be subjected to that $\Phi$ test including m exemplars equal to the sample size determined.

17 Claims, 18 Drawing Sheets

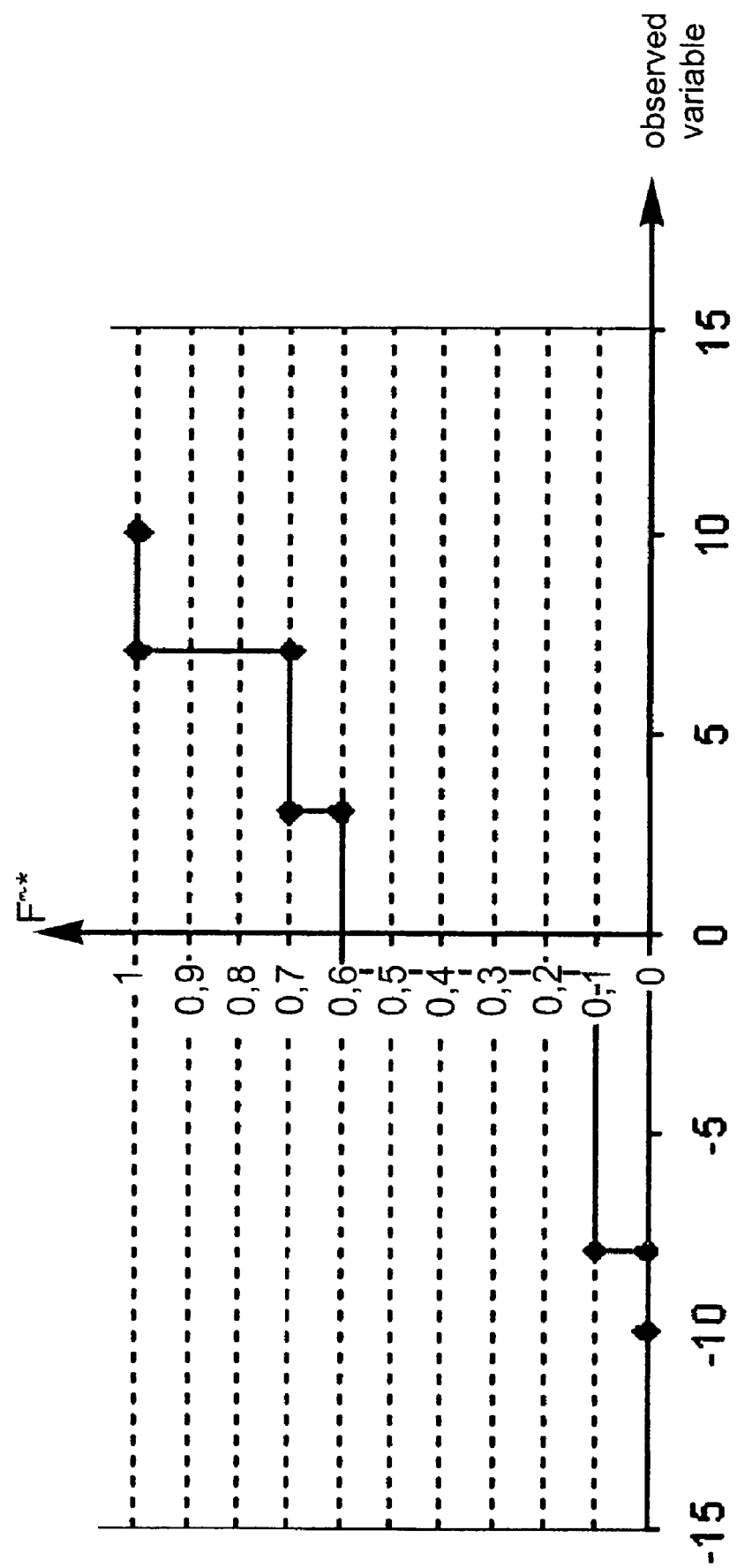

Fig.9  m=60 (B=500, J=2000)

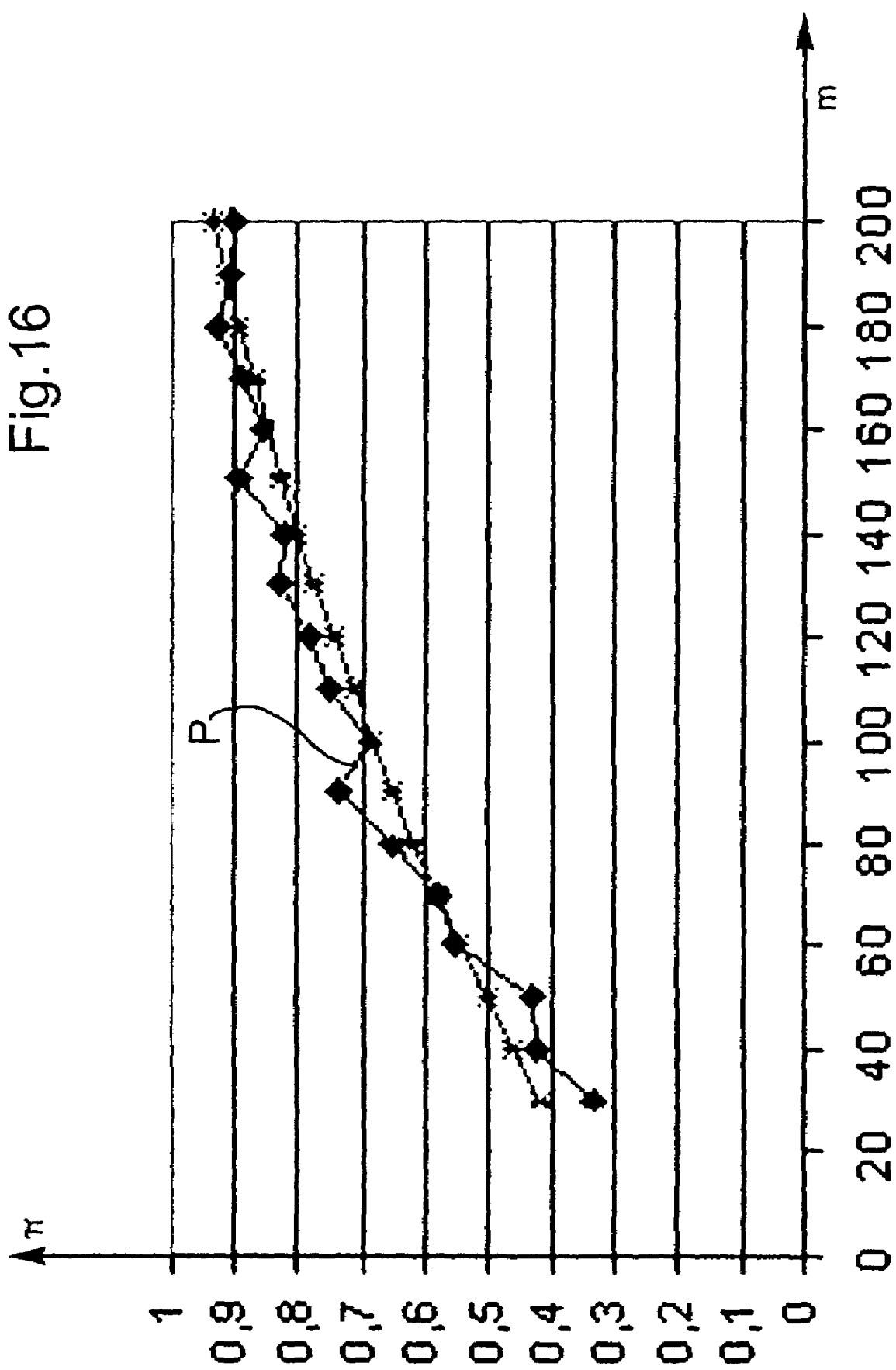

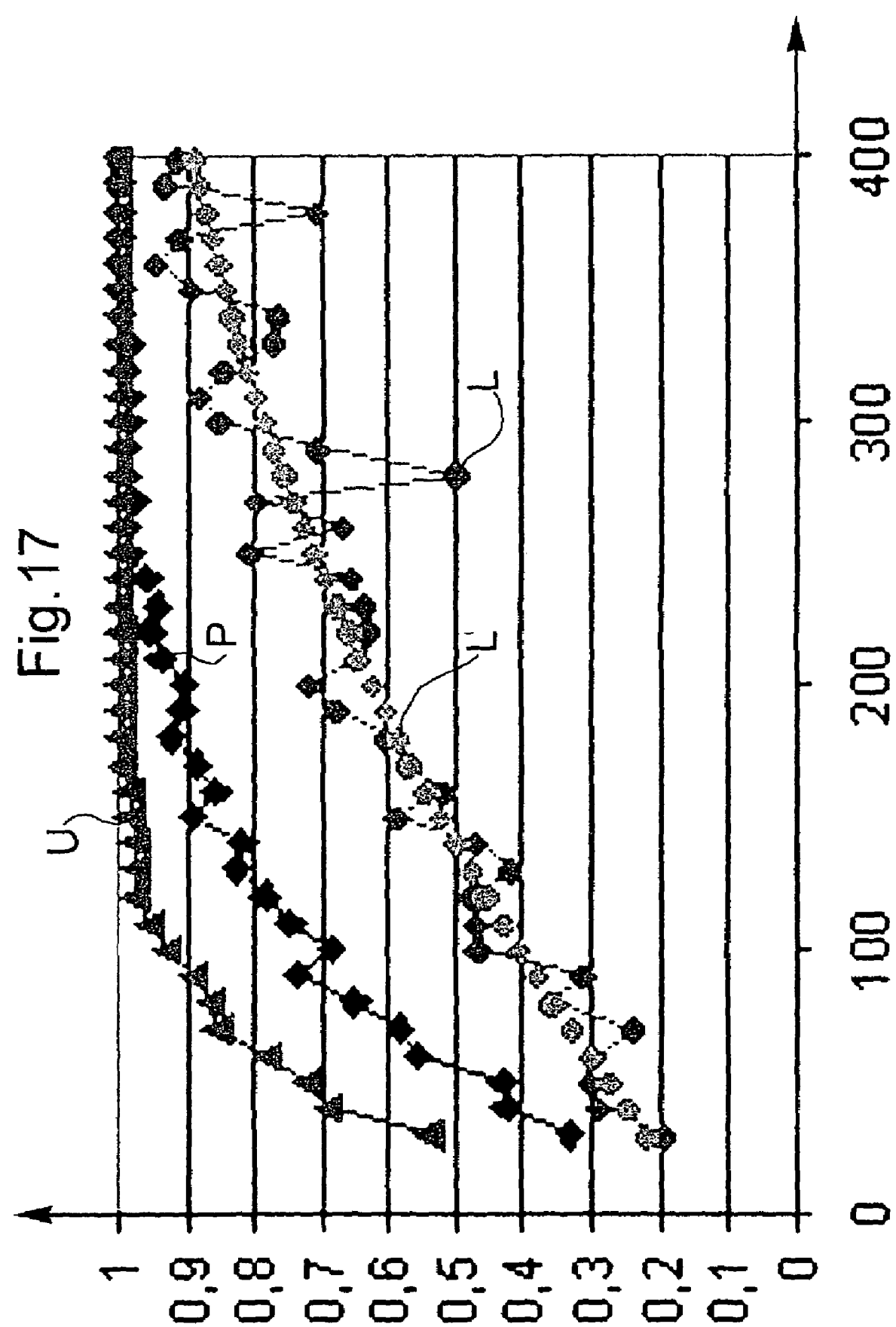

METHOD AND SYSTEM FOR THE STATISTICAL CONTROL OF INDUSTRIAL PROCESSES

BACKGROUND OF THE INVENTION

This invention relates to the control of industrial processes, and in particular a method and a system for the control of an industrial process based on an examination of observed variables obtained from a sample of products which are indicative of the properties of the product generated by the process and correlated with the set process parameters. More specifically it relates to a method and system for statistical control in which the sample size needed to obtain reliable and stable information about the properties of the product is calculated through observing one or more selected variables on the basis of data obtained from a pilot sample.

PRIOR ART

Industrial processes for the production of semi-finished products and finished products of all kinds, including in particular pharmaceuticals, require a process/product development stage in which the process parameters and/or the characteristics of the finished product are established and adjusted on the basis of design specifications and predetermined objectives. During this stage analysis of the products obtained is of particular importance because it is possible to determine the changes which have to be made to stages in the process in order to adjust it for an output which satisfies the required specifications.

In the field of clinical research, and more specifically during the development stage for a drug, research is concentrated, for example, on checking the efficacy of the drug and the best formulation for its chemical composition.

More generally, in the course of the development stage for a finished product or semi-finished product provision is made for checking the quality of the product and its conformance with required specifications, following which any changes in the production plant settings are made.

Again, once a product has come into production, provision is made within the context of quality control processes to extract representative samples of a production batch which are subjected to examination to check that they comply with predetermined production parameters.

In all the circumstances mentioned by way of example, and in yet others which those skilled in the art of production processes will be aware of, establishing the number of measurements of the observed variable for each batch of products (or the number of examplars monitored, that is the sample size) which have to be prepared or taken from a production batch for control of the production process is of particular importance.

The practice of using data originating from a pilot sample to define a sampling plan for statistical check tests is widespread.

Statistical tests, that is the verification of statistical hypotheses, are the method normally used to check that batches generated by a production process conform to particular specifications or, in the medical field, to check the efficacy of drugs under investigation, and also their tolerance.

All processes for the production of new products or for the validation of new pharmacological treatments comprise among other things the gathering of data defined by an experimental protocol. This information, identified through a procedure specified in the experimental protocol and originating from a sample of products or, in the case of the production of drugs, individuals (in the preclinical stages these may be laboratory guinea pigs), is used to perform statistical tests which test hypotheses that the product complies with the requisite specifications, or, in the case of drugs, for example, the efficacy characteristics versus the non-efficacy characteristics of a new drug, or the efficacy of a drug already available on the market or which is in any event known, in the case of a new therapeutic indication, or again tolerance to a new drug in comparison with a preset threshold or another drug.

For example, in the course of quality control problems arise in connection with establishing sample size when engaging in statistical sampling in a particular batch. The identification of an effective sampling plan requires an appropriate choice of the size of the sample which has to be taken from the batch in order to subject it to test and decide whether to reject or accept the entire batch. To check a production process, sampling is carried out at predetermined time intervals t. Thus at every interval t a statistical test is performed to check whether it is necessary to rule out that the characteristic under test, for example an average dimensional characteristic of the batch, actually lies within predetermined tolerances. The tool used to check the production process is known as a "control chart".

Let the (unknown) theoretical reference distribution for the measured values of a selected observed variable X which is indicative of the product's properties be indicated by F.

It is assumed that the distribution F belongs to a space F divided into two parts, $F_0$, or the set of all those distributions which are considered to be non-significant (and therefore for which "the production process produces batches of predetermined quality" or "the drug is ineffective") and $F_1$, the complementary set (that is the set of all distributions in respect of which it is judged that "the process does not produce batches of predetermined quality" or "the drug is effective"). The "Null Hypothesis" is defined as $H_0: F \in F_0$. The "alternative hypothesis", known as $H_1$, is therefore $F \in F_1$.

It is assumed that a set of sample data $X_m = (X_1, \ldots, X_m)$ belonging to a sample space $X_m$ is available. Once a threshold $\alpha$, known as the type I error, has been fixed $X_m$ is divided into two parts, $X^A_m$ and $X^R_m$, regions of acceptance and rejection of the Null Hypothesis respectively, defined on the basis of $\alpha$ and such that $$Pr(X_m \in X^R_m | H_0) \leq \alpha$$

Now the rejection region is defined in such a way that if the null hypothesis were true there would be a probability of less than $\alpha$ of observing the sample information in that region.

The decision making process is as follows: it is first assumed that the null hypothesis is true (that is, for example, that the process produces batches of predetermined quality or that the drug is not effective); then if a sample with low probability is observed the alternative hypothesis $H_1$ is decided upon (continuing the above example: "the process does not produce batches of predetermined quality" or "the drug is effective"), because the data are a true fact, and the null hypothesis is considered to be untrue. Written as a formula, the statistical test $\Phi_\alpha$ is defined as follows:

$$\Phi'_\alpha(X_m) = \begin{cases} 1 & \text{if } X_m \in \mathcal{X}_m^R \\ 0 & \text{if } X_m \in \mathcal{X}_m^A \end{cases}$$

There is therefore a probability which is at the most equal to α of deciding that the process does not produce conforming batches when in fact the process is statistically under control, or that the drug is effective when in fact it is not effective (type I error).

The test can therefore be seen as a decisionmaking process with a yes/no (1/0) outcome, parameterised by a predetermined parameter α: for example the process produces batches of products which do/do not conform to the specifications being checked, or the drug is/is not effective; or again, drug A interacts/does not interact with drug B. Whatever the nature of F, the distribution of observations in $F_0$ or $F_1$, the power of the test is defined as the mean, that is the mathematical expectation, for the test:

$$E_F[\Phi_\alpha(X_m)] = \pi_F(m) = 1-\beta.$$

corresponding to the theoretical frequency of the test $\Phi_\alpha$ outcomes equal to 1.

The test is very often constructed on the basis of a function $T_m$ of the sample $T_m = T_m(X_m)$ with values in R, known as the test statistic, such that for occurrences of $T_m$ with a low probability it tends towards $H_1$. For this purpose a threshold $t_{m,\alpha}$ is established such that occurrences of $T_m$ above that threshold have a probability of α:

$$P(T_m \geq t_{m,\alpha}) = \alpha$$

The test can therefore be defined on the basis of the test statistic:

$$\Phi_\alpha(X_m) = \begin{cases} 1 & \text{if } T_m \geq t_{m,\alpha} \\ 0 & \text{if } T_m < t_{m,\alpha} \end{cases}$$

In the above definitions the statistical test is used to demonstrate a predetermined hypothesis (for example that a production process is out of control or that a drug X is more effective than drug Y). This however is a tool of much wider scope, and is also used to obtain information on the accuracy of the estimate of a parameter which can take any value, whose value it is useful to estimate, checking that this estimate complies with a predetermined accuracy criterion.

If the statistical test $\Phi_\alpha(X_m)$ is defined more generically as an experiment with two possible outcomes: "1"="experiment successful"; "0"="experiment unsuccessful", then even a statistical investigation designed to determine a parameter using a confidence interval of random magnitude $A_m$ will fall into its scope. In fact if the intention is to obtain a sufficiently accurate estimate, this is translated into a desire that the amplitude of the interval should be smaller than a predetermined threshold ε, as a result of which the "1" condition="experiment successful" corresponds to $A_m \leq \epsilon$, and the "0" condition="experiment unsuccessful" corresponds to $A_m > \epsilon$.

Then therefore:

$$\Phi_\alpha(X_m) = \begin{cases} 1 & \text{if } A_m \leq \varepsilon \\ 0 & \text{if } A_m > \varepsilon \end{cases}$$

In all the above situations therefore it is necessary to calculate a sample size m such as to ensure that the statistical test Φ which will be carried out will provide stable results in decisionmaking terms, or is sensitive to changes in the production process. Stability is to be understood as the reproducibility of the decisionmaking outcome.

The reproducibility of the positive outcome="yes" (for example the batch does not conform, or the drug is effective) is the probability of obtaining that outcome. Technically this probability is the power π of the statistical test. We therefore have:

$$Pr(\Phi=1) = \pi$$

The reproducibility π provides information about the stability of the decision, given by the variance of the test:

$$\pi(1-\pi).$$

It will be noted that the significant outcome of a test (Φ=1), for example "batch A does not conform" or "drug A acts better than drug B" cannot be certain, but it will only be possible to tend to it with a predetermined small error α, known as the type I error. As a consequence, if the positive hypothesis were to be actually true, one would tend to it with an increasingly greater probability (or power) as the sample size m increases. In fact, if a batch "does not conform", or if a drug "is effective", there is a probability of reaching the decision that the batch actually does not conform, or that the drug actually is effective, based on random experimental data, i.e. on a sample, which will be larger the more numerous the sample information, provided that the test used is permissible, that is consistent.

If the power obtained with m data is defined as π(m), for a consistent test π(m) will increase towards 1 as m tends to infinity.

Prior investigation of the stability or sensitivity of the test therefore takes the form of calculating a sample size m such as to ensure a predetermined power (for example 80% or 90%) once specific conjectures concerning the distribution F have been formulated. That is, once a required power equal to 1−β has been established, where β∈(0.1), the required sample size is the minimum size ensuring a power of at least 1−β, and is therefore a function of 1−β:

$$m = m(1-\beta) = \min\{m : \pi_F(m) > 1-\beta/F\}$$

where $\pi_F(m)$ is the power of the test performed using m data having a distribution F.

This calculation of m=m (1−β) can be performed if the distribution F is completely known. The work "Sample Size Methodology" by M. M. Desu and D. Raghavarao, Academic Press, Boston, 1989, offers an extensive view of techniques and formulae relating to various statistical tests where F is known.

As an alternative, the distribution of the random variables measuring the conformance of a batch or a pharmacological effect, known as F, can be parameterised using a parameter $\theta \in R^P$. In this respect the analytical form of F is specified, but depends on θ (for example, for a normal distribution p=2 and θ=(μ, σ²)). In this case therefore the power depends on θ, and is indicated as $\pi_{F(\theta)}(m)$.

In circumstances where conjectures concerning the shape of F or F(θ) are only partly specified, or not specified at all, then $\pi_F(m)$ is not known and in order to estimate it use may be made of a pilot experiment of size n.

For example, in a normal distribution either $\sigma^2$ may not be known or the pair ($\mu$, $\sigma^2$) may not be known; alternatively the assumption that the distribution is a normal distribution (or another predetermined distribution) may be considered to be excessive, suggesting a "free" distribution F, that is one without any predetermined analytical shape.

If the distribution is modelled as F(θ), the power is usually an increasing function of a non-centrality parameter $\delta=g(\theta)$, that is it consists of a function g of θ (g represents an application of $R^P$ in R). Because in the case in which the batch is effectively a non-conforming batch, or the drug is actually effective, then $\pi_\delta(m)$ tends to 1 as m increases, and it is then possible to write, having fixed δ:

$$m(1-\beta)=\min\{m:\pi_\delta(m)>1-\beta/\delta\}$$

If θ is not known, then δ is also not known. With a view to approximating the power, an approximation is then made for δ based on the pilot sample. The known method, known as the pointwise estimate method, consists of providing an approximation (technically a pointwise estimate) of δ, which we can define as $\delta_n$, on the basis of which the power can be approximated and therefore an approximation may be determined for m, namely $m_n$:

$$m_n(1-\beta)=\min\{m:\pi_{\delta_n}(m)>1-\beta/\delta\}$$

This calculation procedure, having $m_n$ as its outcome, being based on $\delta_n$, a pointwise estimate of δ, it is therefore based on a pointwise estimate of the power and cannot be very reliable. In fact it is known that on average it provides an m which is too low, with the possibility of not satisfying the constraint of a power greater than 1−β.

Mathematically the situation is that the method using a pointwise estimate of the power to calculate the sample size on average provides an actual power which is less than that desired (namely 1−β):

$$E[\pi(m_n)]<1-\beta$$

In fact, as statistical estimates are involved, the estimated δ, namely $\delta_n$, is affected by an intrinsic variability which should be checked in order to establish an approximate power giving rise to the calculation of an m such as to ensure an acceptable actual power for a new experiment, in line with the predetermined power 1−β.

Using the statistical technique of Confidence Intervals (CI) it is possible to provide a precautionary/conservative lower bound $\delta_{n,1}$ for the non-centrality parameter δ in such a way that $\delta>\delta_{n,1}$ with a predetermined confidence level 1−α1, namely $\Pr(\delta>\delta_{n,1})=1-\alpha1$ with $\alpha1 \in (0,1)$. From this it is possible to derive a lower bound for the power, as this is an increasing function of the non-centrality parameter:

$$\pi_\delta(m)>\pi_{\delta_{n,1}}(m),$$

again with a confidence level 1−α1. Finally, this lower bound for the power is used to determine a conservative sample size based specifically on the information deriving from the pilot experiment:

$$m_{n,\alpha 1}(1-\beta)=\min\{m:\pi_{\delta_{n,1}}(m)>1-\beta/\delta_{n,1}\}$$

However it is not always easy to find a CI for non-centrality parameters, given that the literature is rather poor in this respect. Also, this method cannot be applied in the context of statistical tests in which F has a free distribution.

Another method for calculating the sample size required for a statistical test which does not use the non-centrality parameter δ, and which does not calculate confidence intervals (and therefore a lower bound) for the power, but estimates only a pointwise value, is the approach described in "Estimating the power of the Two Sample Wilcoxon Test for Location shift", by B. J. Collins and M. A. Hamilton published in Biometrics, vol. 44, 1988, pp. 847–860.

This article describes the concept of using the estimator based on a plug-in to approximate the power of the test. This is based on the knowledge that, assuming F is known, it is possible to provide a pointwise estimate of the power curve, that is the power when F is varied towards distributions which are increasingly distant from $F_0$. Replacing the unknown F with an estimate of it, $F^n$, the authors obtain a simplified formula, but one which has nothing to do with the correct theoretical result.

The fact that a pilot sample $X_1, \ldots, X_n$ of measurements of observed variability having an unknown distribution F through which F can be approximated using an estimate $F^n$, i.e. the (cumulative) empirical distribution function:

$$F^n(t)=\frac{1}{n}\sum_{i=1}^{n}I\{X_i \le t\}$$

where I are the indicator functions, is known.

The plug-in method is then used to estimate the power, which involves replacing F by $F^n$ in the power formula, yielding $$\hat{\pi}_{F^n}(m)=E_{F^n}[\Phi_\alpha(X_m^*)]$$

which is a pointwise estimator for the unknown $\pi_F(m)$. In this case the sample data $X^*_m=(X^*_1, \ldots, X^*_m)$ are assumed to be taken from $F^n$, that is from the empirical distribution provided by the pilot sample, instead of F.

In practice this estimate of the power can for example be calculated through an approximation of the Monte Carlo type involving the following operations:

1) extracting, a random sample $X^*_m$ of size m, with replacements, from the pilot sample of size n available
2) calculating the test $\Phi_\alpha(X^*_m)$
3) repeating the two previous steps a large number of times B (B=1000–5000) and counting the percentages of tests yielding an outcome of 1. This percentage is an approximation (a pointwise estimate) to the power of the test.

As a consequence, the sample size obtained will be:

$$m_n(1-\beta)=\min\{m:\hat{\pi}_{F^n}(m)>1-\beta|F^n\}$$

However, this class of methods, known as plug-in methods, does not consider variability in the pilot sample.

Let us consider the following example.

Let us consider the following values of tumour size (observed variable) before and after drug treatment of a genetic nature. This type of therapy is very expensive, and therefore it is desirable to reduce the doses of the drug which have to be synthesised to a minimum in order to observe its effects. Initially a pilot experiment is conducted on a number n=10 of individuals, and the pairs of values 22-19, 18-11, 17-14, 19-17, 22-23, 12-11, 14-15, 11-19, 19-11, 7-8 are observed.

It is decided to apply a statistical test for which the null hypothesis is that the differences for the paired data have a mean of zero, and the alternative hypothesis of a mean which is greater than zero.

There are therefore the following differences $X_1=3$, $X_2=7$, $X_3=3$, $X_4=2$, $X_5=-1$, $X_6=1$, $X_7=-1$, $X_8=-8$, $X_9=8$, $X_{10}=-1$, which expressed as observed values and frequencies become $-8,1$, $-1,3$, $1,1$, $2,1$, $3,2$, $7,1$, $8,1$ from which $F''$, the empirical cumulative distribution function illustrated in FIG. 1, is obtained.

It is decided to set the type I error $\alpha$ at 5%, with the result that the test has the outcome "the drug is not effective" (p-value 0.16). However $F''$ falls within $F_1$, the observed mean being 1.3. Therefore on the basis of these 10 observations it is possible to plan an experiment with a number m of enrolled individuals (and therefore synthesised doses of the drug) in such a way that, assuming that these m behave in accordance with the unknown distribution F which generated the pilot sample of size 10, the predetermined power is 80%.

Assume that it is desired to test whether m=40 is sufficiently large. $\hat{\pi}_{F10}(40)$ must be calculated. Using the plug-in estimator and the Monte Carlo method for example, B=1000 samples of size 40 are extracted from $F^{10}$. One sample will be, for example, $-8,1$, $-1,8$, $1,9$, $2,5$, $3,11$, $7,3$, $8,3$ (that is $X^*_1=-8$; $X^*_2=\ldots=X^*_9=-1$; $\ldots$ ; $X^*_{39}=X^*_{40}=8$) which provides $\Phi=1$ (note that the sum of the frequencies $1+8+9+5+11+3+3=m=40$). Another sample is $-8,6$, $-1,8$, $1,6$, $2,2$, $3,8$, $7,6$, $8,4$ again providing $\Phi=1$. A third sample is $-8,5$, $-1,19$, $1,2$, $2,2$, $3,9$, $7,1$, $8,2$ providing $\Phi=0$. At the end of the 1000 Monte Carlo replications there are calculated to be 717 outcomes equal to 1, resulting in a pointwise estimate of the power with m=40 of $\hat{\pi}_{F10}(40)=71.7\%$. Thus m=40 is still too small a size.

Increasing m so as to obtain an estimated power of 80%, $m_{10}(0.8)=53$ is obtained, representing the estimated sample size on the basis of the pointwise estimate of the power, in this case using the estimator based on the plug-in method (see FIG. 2, which shows the curve for the power of the test in relation to sample size). In the same way, and from FIG. 2, it is deduced that $m_{10}(0.9)=70$ and $m_{10}(0.95)=84$.

Unfortunately the abovementioned calculation procedures, which have as an outcome a pointwise estimate of the power, are not very reliable. In fact on average they provide a sample size which is too small, with a risk of not satisfying the required power constraint.

Specifically, this means that if a sample size determined in this way were to be relied upon, there might be the disadvantage of checking the production process on the basis of an excessively small number of specimens monitored (i.e. measurements of observed variables indicating the properties of the drugs produced for administration during the clinical trial stage, or products/semi-finished products drawn from a production batch), yielding incorrect conclusions.

The choice of an insufficient sample size will result in an increase in the probability of accepting batches which do not have the desired level of quality. This disadvantage may, for example, result in a greater than envisaged quantity of defective products being placed on the market, causing an increase in costs through work to repair or replace the defective products under warranty.

As an alternative, giving preference to satisfying the imposed power constraint and adopting a conservative criterion, an excessive sample size will be adopted, and this will result in additional burdens (in economic and time terms) during the stage of product/process development or during a production stage.

Let us for example consider a system for the control of an industrial process which during the development stage for a finished or semi-finished product provides for a check on product quality and conformance with initial specifications, following which adjustments could be made to the production plant settings, or which, after the start of production, in the context of quality control processes, provide for the aquisition of representative exemplars of a production batch which are to be-subjected to test to ensure that the batch complies with predetermined production parameters.

If the number of exemplars taken is excessive this has the consequence of increasing the costs of analysing the exemplars taken and the time involved in those analyses, as a result of which the product/process development stage may take longer than necessary, and products otherwise intended for marketing would be destroyed, eroding potential turnover.

Let us also consider, in the field of clinical research, an industrial process for the production of drugs in which research during the development stage is concentrated on checking the effectiveness of the drug and the best formulation for its chemical composition. An excessive number of patients and therefore an excessive number of doses of the drug which has to be synthesised and administered will result in an increase in the costs necessary for producing or acquiring the substances involved in the composition of the test drugs, as well as an increase in the costs of supervising the patients and collecting data relating to the pharmacological treatment to which they have been subjected.

SUMMARY OF THE INVENTION

The object of the invention is to provide a process and system for the control of an industrial process which overcomes the disadvantages of the known art, that is which makes it possible, on the basis of measurements of observed variables which are indicative of the product properties in a pilot sample of size n, to calculate a sample size m which is sufficient to make it possible to obtain the results assumed in advance in a future statistical control test, with the minimum predetermined stability, but at the same time limited so as not to waste resources and minimise research and production costs.

Another object of the invention is to provide a process and a system for the control of an industrial process which can be used to determine an admissible range of values for the indicator of the stability of the outcome of a statistical test with which control of the production process is associated, as accurately as possible.

In brief, the invention below is derived from the methods based on plug-in of the empirical distribution function into the test power, but further provides the possibility of also calculating a lower bound for the estimated power, for any statistical test.

The rationalisation involves recognising the plug-in power as a V-statistic, the kernel of which is the statistical test, and provides pointwise consistency of the estimators of the power based on the plug-in, and above all provides consistent confidence intervals for the unknown power of any test which satisfies the abovementioned mathematical hypotheses.

This invention comprises a new method for the control of production processes which comprises determining an appropriate sample size on the basis of approximation of the power of a statistical test based on information originating from a pilot experiment, without going through estimation of the non-centrality parameter δ, but using a plug-in method for the unknown distribution F. The method to which the invention relates is based on the determination of an admissible interval of values for the power (technically a Confidence Interval) having a confidence level or degree of reliability 1−α1 (where α1∈(0.1)), for statistical tests having one or more (k) groups, on experimental data which may have one or more (d) dimensions. In technical language this method of estimating the power comprises a mono- or multi-dimensional statistical test, with one or more samples.

It is also provided a method which comprises determining a confidence interval for the unknown power of the statistical test, that is π, carried out on the n data for the observed variable available.

This method is of an absolutely general nature, in that it can be applied to a very great variety of problems: to tests on the mean effects of a drug, to tests on the influence of an operating parameter on a production process, to tests on the quality of a production process, to tests on the yield of a process, to tests on the capacity indicators of a process, etc., in practice to all decisionmaking procedures based on random sampling, that is statistical tests, which have an outcome of the yes/no type.

BRIEF DESCRIPTION OF THE DRAWINGS

Other advantages and characteristics of the present invention will become clear from the following detailed description which is given provided purely by way of non-limiting example with reference to the appended drawings, in which:

FIGS. 4 and 5 are graphs which show the form of the cumulated empirical distribution function obtained by resampling the set of measured values in FIG. 1, FIGS. 16 and 17 are graphs showing pointwise and interval estimates of the power calculated on the basis of the smoothed empirical distribution function in FIG. 15, as a function of sample size.

DESCRIPTION OF PREFERRED EMBODIMENTS OF THE INVENTION

Figure 1:
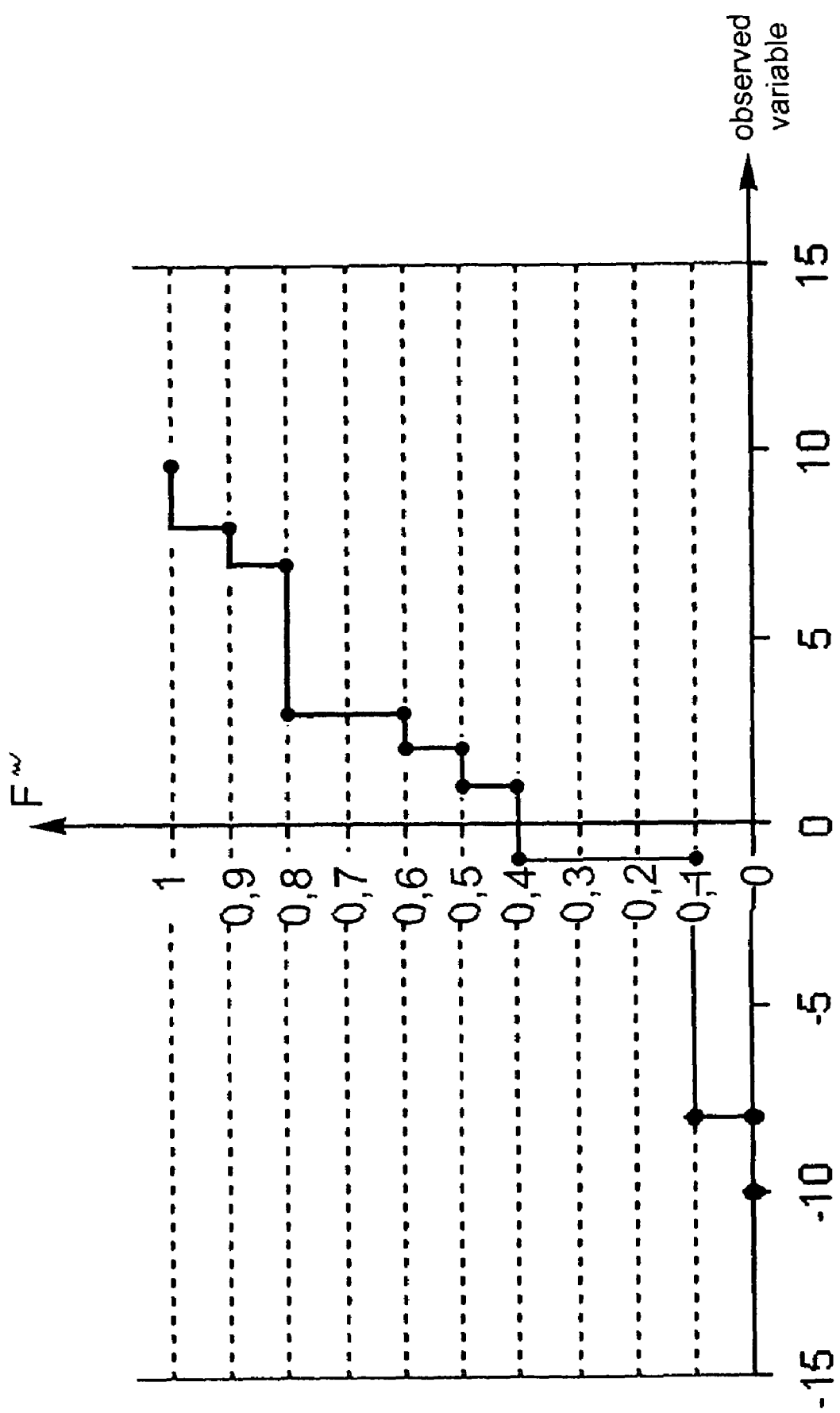
FIG. 1 is a graph showing the form of a cumulated empirical distribution function obtained from an exemplary set of measured values of an observed variable.

A system for the control of an industrial process includes a processing system associated with the production line, such as for example an electronic processor or work station arranged for receiving a series of sample data, that is the values of one or more selected observed variables which are indicative of the properties of the product, relating to a sample (which is in the limit exhaustive) of the products obtained from the process, and for generating data for control of the process parameters.

The sample data may be provided to the processing system by an operator through a user interface, or automatically through transmission via a dedicated communications network from an associated control equipment. This equipment may for example be an equipment measuring physical and/or geometrical quantities of a product drawn from a batch, or, an equipment for control of the process of synthesizing a drug.

The data received are processed through a calculation algorithm illustrated in detail in the remainder of this description.

This algorithm can be used to determine at least a lower bound (and possibly an upper bound) for the power of a statistical test for a given sample size, and consequently the minimum sample size necessary for that lower bound to be at least equal to or greater than a predetermined value.

The results of the processing are then provided to the operator through the user interface and/or are used automatically by the system to act on, the process parameters which it controls, to vary or adjust them.

Industrial processes, including in particular processes for the synthesis and production of drugs, require a product development stage in which the process parameters and/or characteristics of the finished product are determined and adjusted in relation to design specifications and predetermined objectives. During this stage analysis of the properties of the products obtained is of particular importance, because it is possible to identify modifications which have to be made to the process stage to adjust it in order to obtain an output which satisfies the desired specifications.

In the context of quality control processes, once a product has come into production the taking of representative samples of a production batch to subject them to test to check that they comply with predetermined production parameters is envisaged.

Examination of the products obtained during the product/process development stage or taken from the actual production stage, or better analysis of the values adopted by the observed variable which is indicative of the properties of the product, constitutes the basis of a statistical test whose power provides information about the reproducibility or sensitivity of the decisionmaking outcome of the test.

A statistical test with one sample is a decision making procedure defined as in the introduction to this description, in which the sample data $X_m = X_1, X_2, \ldots, X_m$, with $X_1 \in R^P$ (i.e. a p-dimensional random variable), for $i=1, \ldots m$, are values of the observed variable having a distribution F.

If the distribution F is not known, but a pilot sample is available, an approximation to the power may be made and the sample size m may be calculated on the basis of a predetermined desired power $(1-\beta)$ using methods similar to what has been described in relation to the known art. These methods however give rise to the risk of examining an excessively limited number of sample elements.

The $\Phi_\alpha$ statistical test be now regarded as the kernel, of size m, of a V-statistic (defined in "Approximation Theorems of Mathematical Statistics", R. J. Serfling, Wiley, New York, 1980). It is possible to verify that the regularity hypotheses $$E_F[|\Phi_\alpha(X_m)|^r]<\infty$$

are satisfied by this kernel.

Thus, the power obtained with the plug-in through pilot sample $X_1, X_2, \ldots X_n$ is a V-statistic, that is $$\frac{1}{n^m}\sum_{i_1=1}^{n}\ldots\sum_{i_m=1}^{n}\Phi_\alpha(X_{i_1},\ldots,X_{i_m}) = E_{F^n}[\Phi_\alpha(X_1^*,\ldots,X_m^*)] = \hat{\pi}_{F^n}(m)$$

where $X^*_1, \ldots, X^*_m$ are to be regarded as m random data drawn with replacement from the sample data $X_1, \ldots, X_n$, and therefore drawn from an $F^n$ distribution approximating F.

Considering the following error statistic $$\sqrt{n}(\hat{\pi}_{F^n}(m)-\pi_F(m)) \quad (I)$$

if the distribution were known its percentiles could be used to provide a Confidence Interval for the unknown power $\pi_F(m)$. However, from the theory of V-statistics, only the asymptotic distribution of (I) corresponding to a normal distribution with a variance $\xi$ depending on F is known. In addition to the extreme technical difficulty of calculating $\xi$ in a situation where F is known, it will be noted that $\xi$ will be unknown where F is not known.

Let $F^{n*}$ now be a generic element in the family of empirical distribution functions which would be obtained by randomly drawing n data $X^*_1, \ldots X^*_n$, with replacement, from the n observations originating from the pilot sample $X_1, \ldots, X_n$. The bootstrap version of the plug-in power, that is of the V-statistic having the statistical test as its kernel, is therefore defined as:

$$\hat{\pi}_{F^{n*}}(m) = E_{F^{n*}}[\Phi_\alpha(X_1^{},\ldots,X_m^{})] = \frac{1}{n^m}\sum_{i_1=1}^{n}\ldots\sum_{i_m=1}^{n}\Phi_\alpha(X_{i_1}^*,\ldots,X_{i_m}^*)$$

where $X_1^{}, \ldots, X_m^{}$ represent m random data drawn with replacement from the data $X_1^*, \ldots, X_n^*$, and that can therefore be drawn from $F^{n*}$. It is then possible to approximate the distribution of statistic (I) with the distribution of the following statistic (II):

$$\sqrt{n}(\hat{\pi}_{F^{n*}}(m)-\hat{\pi}_{F^n}(m)) \quad (II)$$

It will be noted that the distribution of this latter random variable depends only on the data observed in the pilot sample, and therefore, as the sample is known, it is completely known. The calculation of this distribution presents considerable difficulties, and therefore, if it is desired to avoid the analytical calculation, resort may be had to approximation methods of the Monte Carlo type.

On the basis of the above, making use of the $\sqrt{n}(\hat{\pi}_{F^{n*}}(m)-\hat{\pi}_{F^n}(m))$ percentiles and using these percentiles as if they were percentiles of $\sqrt{n}(\hat{\pi}_{F^n}(m)-\pi_F(m))$, it is possible to calculate the bounds (lower bound, upper bound) of a confidence interval having a predetermined level 1-α1 for the true power $\pi_F(m)$.

For example, if $t_q$ is the $q^{-th}$ quantile of $\sqrt{n}(\hat{\pi}_{F^{n*}}(m)-\hat{\pi}_{F^n}(m))$, i.e. is such that the relative frequency (that is the percentage) of the points in $\sqrt{n}(\hat{\pi}_{F^{n*}}(m)-\hat{\pi}_{F^n}(m))$ less than or equal to $t_q$ is equal to q, that is $$Pr(\sqrt{n}(\hat{\pi}_{F^{n*}}(m)-\hat{\pi}_{F^n}(m))\leq t_q)=q$$

it is possible to calculate $t_{\alpha 1/2}$ and $t_{1-\alpha 1/2}$ such that $$Pr(t_{\alpha 1/2}\leq\sqrt{n}(\hat{\pi}_{F^{n*}}(m)-\hat{\pi}_{F^n}(m))\leq t_{1-\alpha 1/2})=1-\alpha 1$$

For asymptotic approximation between (II) and (I) we have:

$$Pr(t_{\alpha 1/2}\leq\sqrt{n}(\hat{\pi}_{F^n}(m)-\pi_F(m))\leq t_{1-\alpha 1/2})\approx 1-\alpha 1$$

From which it follows that:

$$Pr(\hat{\pi}_{F^n}(m)-t_{1-\alpha 1/2}/\sqrt{n}\leq\pi_F(m)\leq\hat{\pi}_{F^n}(m)-t_{\alpha 1/2}/\sqrt{n})\approx 1-\alpha 1$$

through which the lower bound and upper bound of a bilateral centered and symmetrical confidence interval having a confidence level 1-α1 are obtained, for the power of the test with one sample. One actual value of this lower bound, which is indicated as $$\hat{\pi}_{F^n,l}^{\alpha 1}(m)$$

is given by the observed value of $\hat{\pi}_{F^n}(m)-t_{1-\alpha 1/2}/\sqrt{n}$ if the data for the pilot sample:

$$\hat{\pi}_{F^n,l}^{\alpha 1}(m) = \hat{\pi}_{F^n}(m) - t_{1-\alpha 1/2}/\sqrt{n}$$

are known.

Note that $t_{1-\alpha 1/2}/\sqrt{n}=\hat{\pi}_{F}^{n*}(m)_{(1-\alpha 1/2)}-\hat{\pi}_{F^n}(m)$, where $\hat{\pi}_{F}^{n*}(m)_{(1-\alpha 1/2)}$ represents the 1-α1/2-th quantile of the $\hat{\pi}_{F^n}^{*}(m)$ distribution, for which $$\hat{\pi}_{F^n,l}^{\alpha 1}(m) = 2\hat{\pi}_{F^n}(m) - \hat{\pi}_{F^{n*}}(m)_{(1-\alpha 1/2)}$$

Similarly the upper bound is $$\hat{\pi}_{F^n,u}^{\alpha 1}(m) = 2\hat{\pi}_{F^n}(m) - \hat{\pi}_{F^{n*}}(m)_{\alpha 1/2}$$

In operational terms, the calculation is very complex. It would be possible, again on a theoretical basis, to carry out a precise calculation. In a preferred embodiment approximate methods are used, for example based on Monte Carlo simulations, as the following algorithm usually defined as Bootstrap "t":

Part A—Pointwise estimate of the power
1) a random sample $X_1^*, \ldots, X_m^*$ of size m is drawn, with replacement, from the pilot sample of size n available,
2) the test $\Phi_\alpha(X_1^*, \ldots, X_m^*)$ is calculated,
3) the two preceding steps (1 and 2) are repeated a number of times B (e.g. B=1000) and the percentage of tests yielding an outcome of 1 are counted. This percentage MC$\hat{\pi}$F$^n$ (m) is a Monte Carlo expression of the pointwise estimate for the power of the test $\hat{\pi}$F$^n$(m).

Part B—Calculation of the Bootstrap Distribution
1) a random sample $X_1^*, \ldots, X_n^*$ of size n is drawn, with replacement, from the pilot sample of size n available,
2) a random sample $(X_1^{}, \ldots, X_m^{})$ of size m is drawn, with replacement, from the "resampling" sample $X_1^*, \ldots, X_n^*$,
3) the test $\Phi_\alpha(X_1^{}, \ldots, X_m^{})$ is calculated,
4) the two preceding steps (2 and 3) are repeated a number of times B (e.g. B=1000) and the percentage of tests yielding an outcome of 1 are counted. This percentage, indicated by $\hat{\pi}_{F^n}{}^*_j(m)$ is the $j^{th}$ point of the bootstrap distribution of the power of the test,
5) steps 1 to 4 are repeated J number of times (e.g. J=1000), yielding $\hat{\pi}_{F^n}{}^*_1(m), i\hat{\pi}_{F^n}{}^*_2(m), \ldots, \hat{\pi}_{F^n}{}^*_J(m)$ and therefore providing J points on the bootstrap distribution.

Part C—Calculation of the lower bound.
1) the J points obtained in part B are ranked in increasing order and, a1 having been fixed in advance, the $J(1-\alpha1/2)^{th}$ of the ordered data is taken as $\hat{\pi}_{F^n}{}^*(m)_{(1-\alpha1/2)}$, this being defined as $MC\hat{\pi}F^{n*}(m)_{(1-\alpha1/2)}$,
2) Using the bootstrap method "t" and Monte Carlo approximation, the lower bound of the power is then:

$$(MC,t)\hat{\pi}_{F^n,l}^{\alpha 1}(m) = 2_{MC}\hat{\pi}_{F^n}(m) - {}_{MC}\hat{\pi}_{F^n}(m)_{(1-\alpha 1/2)}$$

Errors in the Monte Carlo approximation to the pointwise estimates of the power can be controlled through the choice of B. In fact the asymptotic variance of the power estimator based on the Monte Carlo Method (that is $MC\hat{\pi}F^n(m)$) is $\xi_{1,m}m^2/B$, where the parameter $\xi_{1,m}$ can be calculated when $F^n$ is known. In addition to this, due to the asymptotic normality of the Monte Carlo power estimator, the interval $$[MC\hat{\pi}F^n(m)-z_{1-\gamma/2}\sqrt{\xi_{1,m}}m/\sqrt{B}, MC\hat{\pi}_{F^n}(m)+z_{1-\gamma/2}\sqrt{\xi_{1,m}}m/\sqrt{B}]$$

includes $\hat{\pi}_{F^n}(m)$ with an approximate probability $1-\gamma$. For example, in the case where $\gamma=0.05$, m=200 and $\xi_{1,m}=0.00000025$ there is an error corresponding to $\pm 1.96\sqrt{0.00000025}\,200/\sqrt{B}$, if this is made to correspond to 0.5% it has the result that $B=(1.96\times 0.1/0.005)^2=1537$.

In any event, B can also be found by using the following increment $\xi_{1,m}m^2 \leq 1$. Taking the above example again, one would in fact have $\pm 1.96\times 1/\sqrt{B}=0.005$, from which $B\approx 154000$.

Through choosing J it is possible to control the errors in the Monte Carlo approximation for the limits of the Confidence Intervals. In fact the distribution of the pivot statistics based on the V-statistic can be approximated through J Monte Carlo replications, in order to calculate its percentile of interest $t_{\alpha 1}$. The estimator for the percentile of interest which is obtained using the Monte Carlo method, that is ${}_{MC}t_{\alpha 1}$, can be approximated asymptotically to a normal distribution having as mean the percentile of interest $t_{\alpha 1}$ and as variance $\alpha 1(1-\alpha 1)/J(f(t_{\alpha 1}))^2$, where $f(t_{\alpha 1})$ represents the density of the distribution of interest calculated in $f(t_{\alpha 1})$. Thus the interval $$[{}_{MC}t_{\alpha 1}-z_{1-\gamma/2}\sqrt{\alpha 1(1-\alpha 1)/J}/f(t_{\alpha 1}), {}_{MC}t_{\alpha 1}+z_{1-\gamma/2}\sqrt{\alpha 1(1-\alpha 1)/J}/f(t_{\alpha 1})]$$

includes $t_{\alpha 1}$ with a probability of approximately $1-\gamma$.

For example, if $\gamma=0.05$, $\alpha 1=0.25$ and $f(0.25)=1$ there is an error corresponding to $\pm 1.96\sqrt{0.25\times 0.75}/\sqrt{J}$, which if this is made to correspond to 2% has the result that $J=1.96^2\times 25\times 75/4=1800$.

In the situation where $f(\alpha 1)$ is not known, it can be approximated using Newton's method after a first cycle with J fixed, for example at 1000.

Another way of obtaining a lower bound for the power, on the basis of the same theorems, again using the characteristics of the V-statistics, consists of the so-called "Bootstrap Percentile".

The "Bootstrap Percentile" is based on the fact that the statistic (I), but with the opposite sign, that is $-\sqrt{n}(\hat{\pi}_{F^n}(m)-\pi_F(m))$, has the same asymptotic distribution as statistic (I), and therefore as statistic (II). Thus the percentiles of statistic (II) can also be used in this case.

In this case the algorithm is as follows:
Part A—Pointwise Estimation of the Power: Not Necessary,
Part B—Calculation of the Bootstrap Distribution: as Above,
Part C—Calculation of the Lower Bound:
1) the J points obtained in part B are ranked in increasing order and, having previously set $\alpha 1$, the $J\cdot\alpha 1/2^{th}$ of the ordered data is taken, this being defined as $MC\hat{\pi}_{F^n}{}^*(m)_{(\alpha 1/2)}$,
2) the lower bound for the power is therefore $$(MC, p-\text{tile})\hat{\pi}_{F^n,l}^{\alpha 1}(m) = MC\hat{\pi}_{F^n}(m) - MC\hat{\pi}_{F^n}(m) + MC\hat{\pi}_{F^{n*}}(m)_{(\alpha 1/2)}$$
$$= MC\hat{\pi}_{F^{n*}}(m)_{(\alpha 1/2)}$$

There is another method of calculating the lower bound based on the bootstrap, the so-called bootstrap BCa (Bias-Corrected and Accelerated) method. This method is more refined and operates more satisfactorily, especially for statistics having an asymmetrical distribution such as those of type I. It consists of a suitable adjustment to $\alpha 1$, based on some of the shape parameters of statistic (II), and therefore calculatable when the sample is known. In particular it is necessary to calculate the acceleration parameter and one of the possible ways of doing this comprises using the so-called "jack-knife" algorithm described in the work "An Introduction to the Bootstrap" by B. Efron and R. J. Tibshirani, ed. Chapman & Hall, 1993.

Thus $\alpha 1(BC_a)$ is defined as a "adjustment" for $\alpha 1$, from which is obtained the lower bound for the power $$(MC, BC_a)\hat{\pi}_{F^n,l}^{\alpha 1}(m) = MC\hat{\pi}_{F^{n*}}(m)_{(\alpha 1/2(BCa))}$$

Because of the fact that $$(MC, BC_a)\hat{\pi}_{F^n,l}^{\alpha 1}(m)$$

tends in some circumstances to underestimate while (MC, p-tile)$\hat{\pi}_{F^n,l}^{\alpha 1}(m)$ tends on the contrary to overestimate, the estimator provided by the simple mean of the two, which is sometimes more centered, that is:

$$(MC, \text{mix})\hat{\pi}_{F^n,l}^{\alpha 1}(m) = ((MC, p-\text{tile})\hat{\pi}_{F^n,l}^{\alpha 1}(m) + (MC, BC_\alpha)\hat{\pi}_{F^n,l}^{\alpha 1}(m))/2$$

can also be used.

Calculation of the upper bound for the Confidence Interval having a confidence level of 1−α1 makes reference to $t_{\alpha 1/2}/\sqrt{n}$, which is determined using methods similar to those seen above, yielding, respectively, $$(MC, t)\hat{\pi}_{F^n,u}^{\alpha 1}(m) = 2_{MC}\hat{\pi}_{F^n}(m) - {}_{MC}\hat{\pi}_{F^{n*}}(m)_{(\alpha 1/2)}$$

$$(MC, p-tile)\hat{\pi}_{F^n,u}^{\alpha 1}(m) = {}_{MC}\hat{\pi}_{F^{n*}}(m)_{(1-\alpha 1/2)}$$

$$(MC, BC_\alpha)\hat{\pi}_{F^n,u}^{\alpha 1}(m) = {}_{MC}\hat{\pi}_{F^{n*}}(m)_{(1-\alpha 1/2(BC_\alpha))}$$

$$(MC, \text{mix})\hat{\pi}_{F^n,u}^{\alpha 1}(m) = ({}_{(MC,p-\text{tile})}\hat{\pi}_{F^n,u}^{\alpha 1}(m) + {}_{(MC,BC_\alpha)}\hat{\pi}_{F^n,u}^{\alpha 1}(m))/2$$

Finally, in order to determine the sample size such that the power is at least equal to the predetermined desired value 1−β, on the basis of a pilot experiment of size n, with a confidence of 1−α1, it is therefore found, using the iterative calculation method and increasing m, that:

$$m_{n,\alpha 1}(1-\beta) = \min\{m: {}_{(MC^*,)}\hat{\pi}_{F^n,l}^{\alpha 1}(m) > 1 - \beta \mid F^n\}$$

where * means that any of the methods for calculating the lower bound may be applied. Of course this choice will influence the result of $m_{n,\alpha 1}(1-\beta)$, as will the choice of β and α1.

In reality, the parameter α1 selected to define the confidence level or degree of reliability of the confidence interval will be closer to the true value of that confidence the larger the size of the pilot sample. It may therefore be useful to calibrate the confidence intervals for the power, because of the merely asymptotic correctness of the bootstrap confidence intervals. In this respect the parameter α1 will first be estimated on the basis of the measurement data acquired $(X_1, \ldots X_n)$, and then the estimate found will be used to calculate the lower bound for the power as indicated above.

An algorithm which is currently preferred for estimating α1 is the following:
1) application of Part A—Pointwise estimation of the power of the algorithm defined above and calculation of the pointwise estimate of the power $\hat{\pi}_{F^n}(m)$,
2) assignment of a minimum initial value in the interval (0, 0.5), for example the value 0.05, to a transit variable α1', the upper bound of the interval in question being the valid one for centered and symmetrical bilateral confidence intervals,
3) repetition K times (for example K=1000) of part B—calculation of the bootstrap distribution for the algorithm defined above and calculation of the number of times, as a percentage, $\hat{\pi}_{F^n}*(m)(\alpha 1')$ is greater than $\hat{\pi}_{F^n}(m)$ for the assigned value of α1', this being a value of a calibration function (α1'),
4) incrementing α1' by a predetermined value (for example 0.05) and repeating step 3) until α1'<0.5,
5) considering the calibration function cal (α1') in the domain (0, 0.5) and co-domain [0.1], and rendering it continuous, for example by interpolation with a succession of linear segments between known points,
6) considering the value $\text{cal}^{-1}(\alpha 1)$ as an estimate of α1.

If it is wished to calculate the CI for the power, with a confidence level 1−α1, as m increases between two predefined values $m_1 < m_2$, again on the basis of a pilot experiment of size n, the bounds (lower bound, upper bound) obtained as described are used. It is therefore possible to find an upper confidence limit and a lower confidence limit for the power for each $m \in [m_1, m_2]$, and thus provide a corresponding graph.

An example of one way of implementing the method to which the invention relates is described below.

Figure 3A:
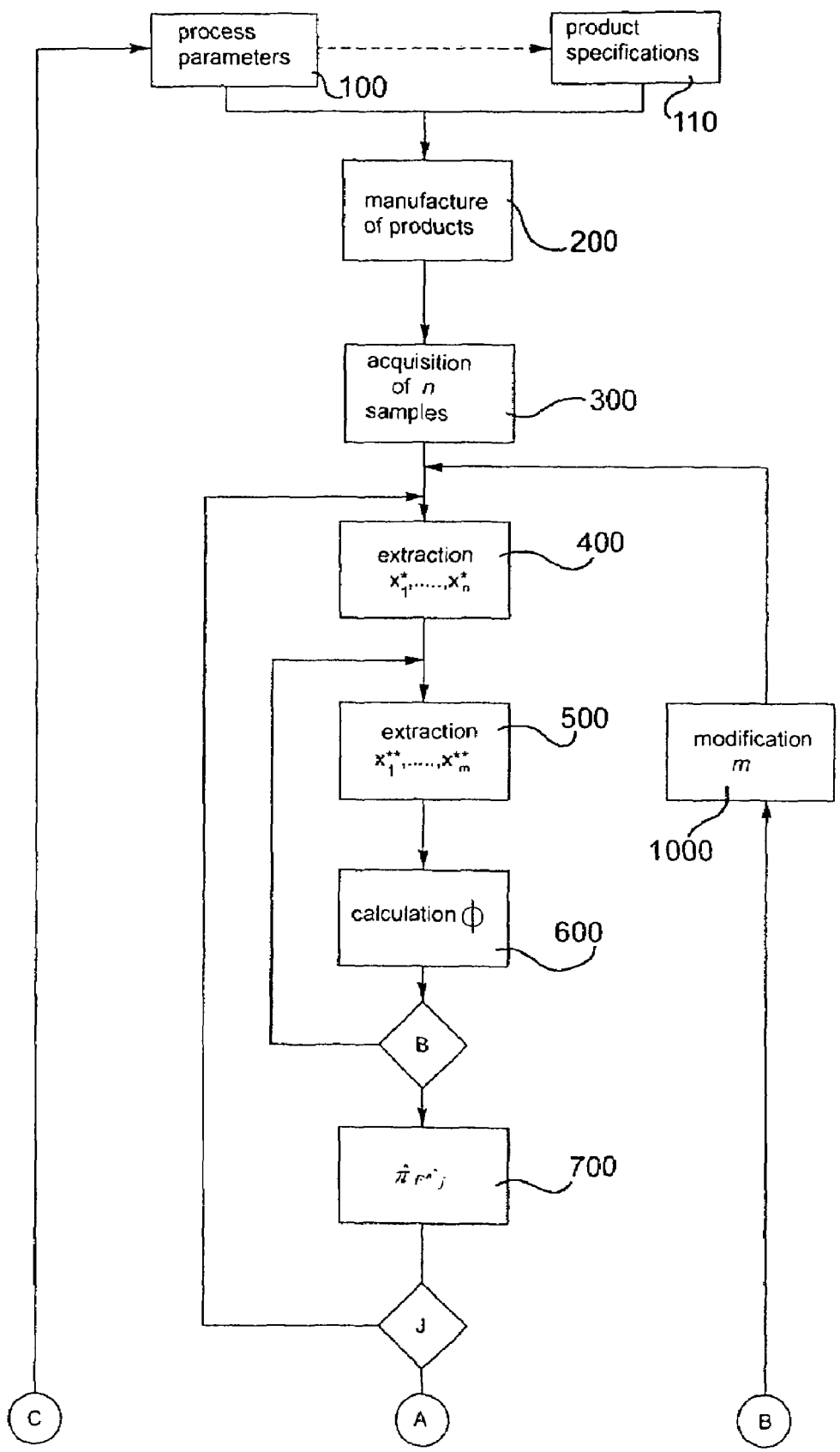
FIGS. 3a and 3b show a flow chart of the process to which the invention relates.
Figure 3B:
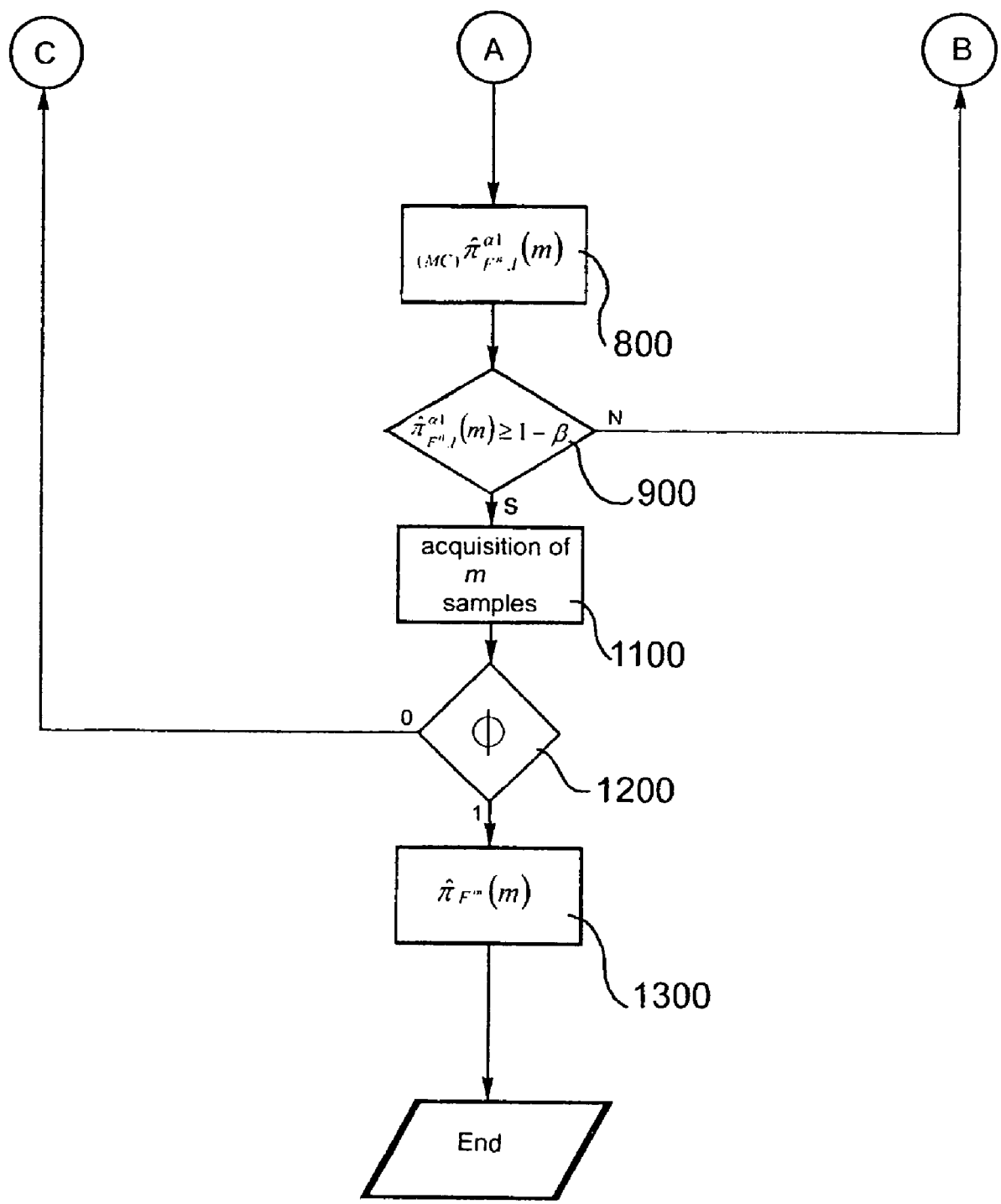

The example mentioned in the introduction to the description, relating to the control of the process for the synthesis of doses of a drug for the treatment of tumours, is considered. The process parameters and product specifications (composition of the drug) required will respectively be initially established in steps 100, 110 with reference to the flow chart in FIGS. 3a and 3b.

Then, n doses of the drug to be administered will be synthesised in step 200 for as many patients that are under observation, for which data for the predetermined observation variable(s) will be acquired in step 300.

Figure 2:
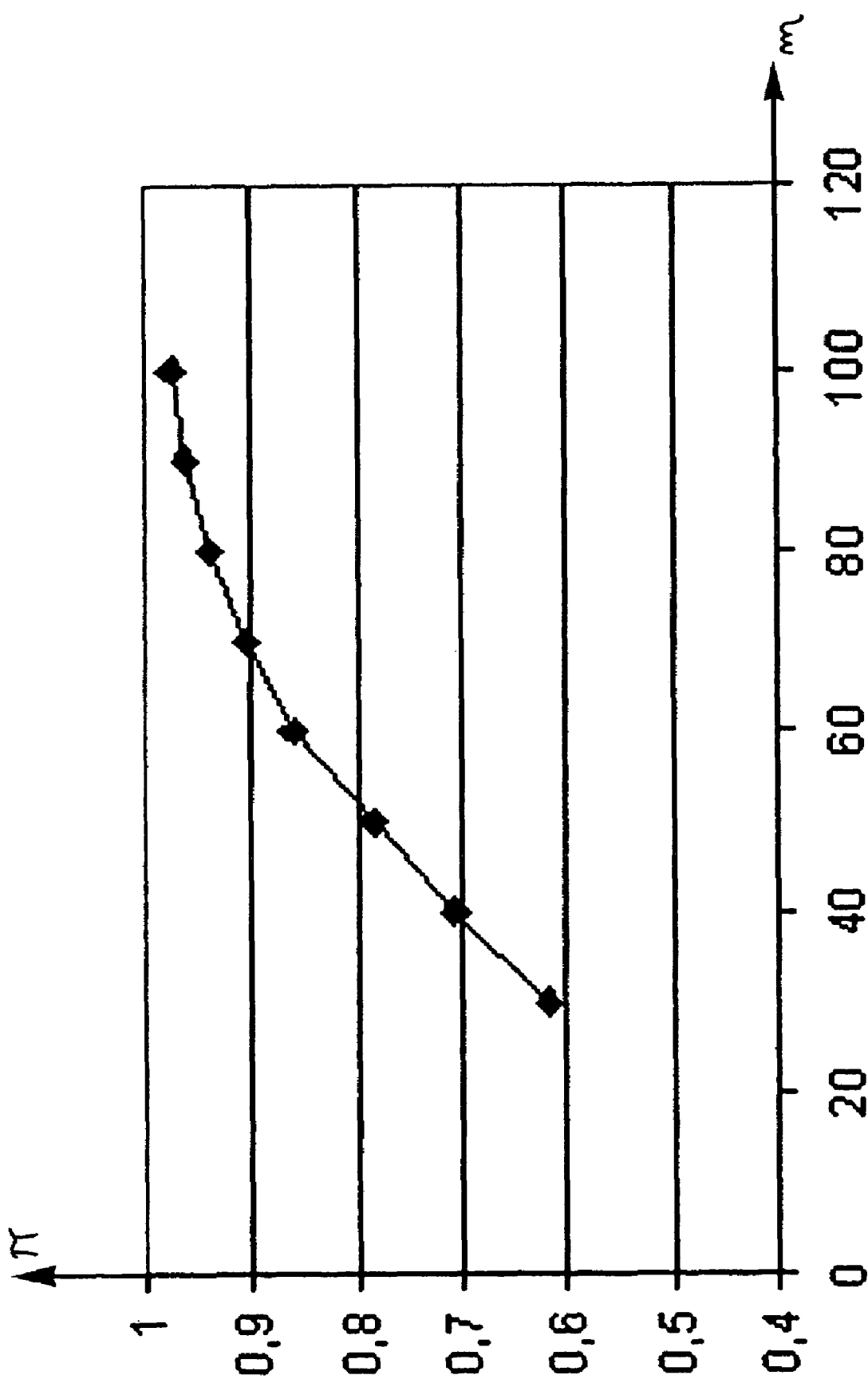
FIG. 2 is a graph showing the estimated power curve in pointwise form of an example statistical test as a function of the sample size.

The same data as provided in the example mentioned in the introductory part of the description will be considered. These data are acquired from the processing system controlling the industrial process. This will therefore have the following pilot sample of differences, followed by the corresponding frequencies −8,1, −1,3, 1,1, 2,1, 3,2, 7,1, 8,1 (see FIG. 1). As previously, α=0.05 and the power to be achieved will be 80%. The sample size value of m=60 will also be selected as a starting value (for example from analysis of the graph in FIG. 2 in relation to a previous calculation of the pointwise estimate of the power) to calculate the bootstrap distribution to establish whether with this number the lower bound provided by a bidirectional CI at a level of 20% (that is α1=80%) will be sufficiently high, that is greater than 1−β=80%. As an alternative it would be possible to set m=n or, even better, m=2.

Applying part B of the algorithm described, a first resample of size n identical to that of the guide sample, that is n=10, will be obtained in step 400: for example −8,1, −1,5, 1,0, 2,0, 3,1, 7,3, 8,0 (which gives rise to the cumulated distribution function in FIG. 4). From this sample will be drawn (in step 500) B=300 random resamples with-replacement of size m=60, each of which provides one result for the test (step 600), and the percentage of significant results will be $\hat{\pi}_{F^{10}*,l}(60) = 18.6\%$. This 18.6% calculated in step 700 is the contribution of the first resample to the bootstrap distribution for the power with m=60.

Figure 5:
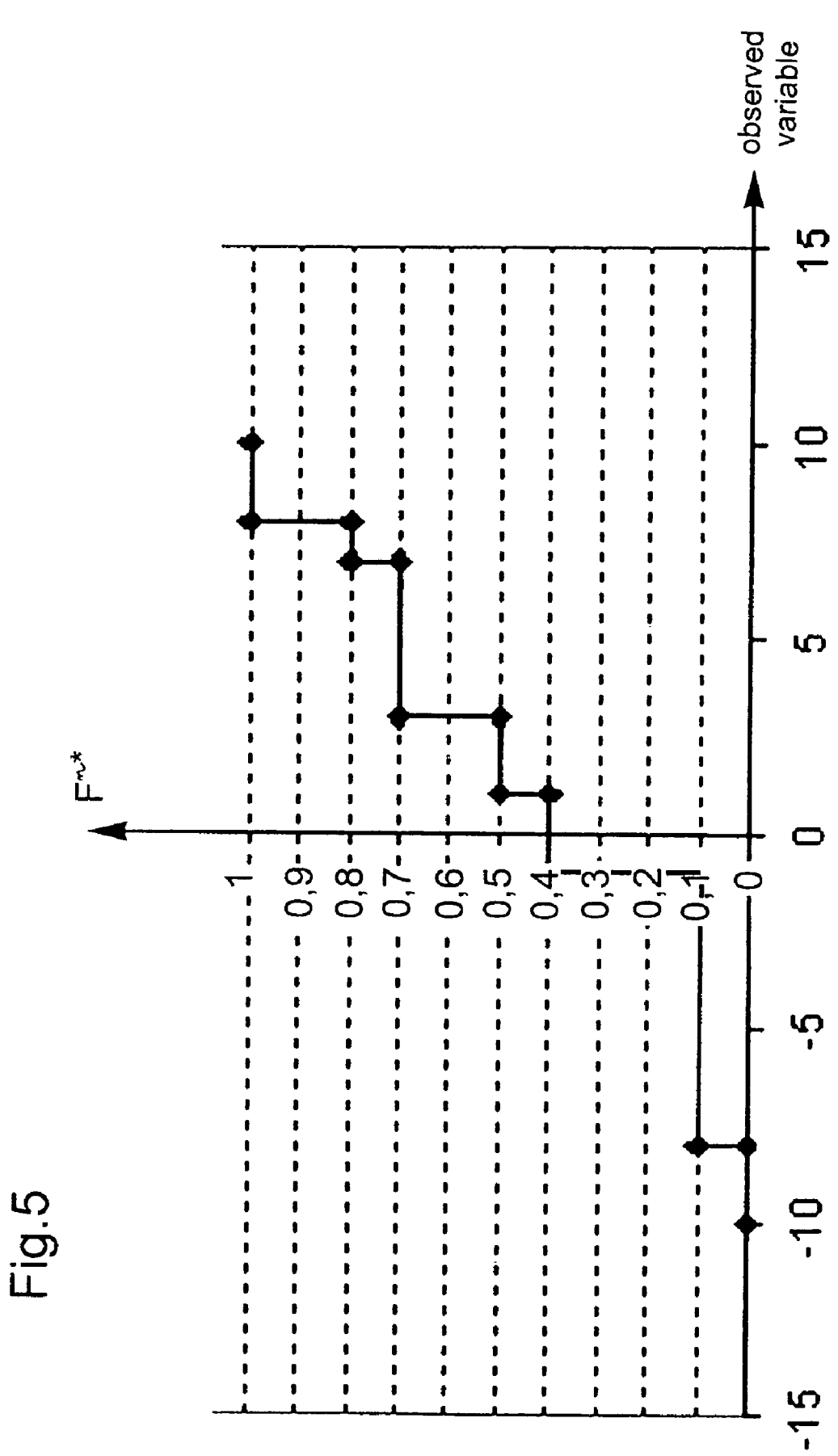

Another resample, again of size n=10 will then be obtained (step 400): for example −8,1, −1,3, 1,1, 2,0, 3,2, 7,1, 8,2 (having the cumulated distribution function illustrated in FIG. 5). As in the case of the previous resampling it will be necessary to obtain 300 re-resamples of size m=60 (step 500). The first of these is −8,8, −1,23, 1,5, 2,0, 3,14, 7,2, 8,8; and from this sample a non-significant test will be obtained (step 600). Another re-resample will be −8,5, −1,17, 1,8, 2,0, 3,15, 7,4, 8,11, and a significant test will be obtained from this sample (step 600). At the end of B=300 iterations, will have been obtained 262 extractions which have provided a significant test for an estimated power of $262/300 = 87.3\% = \hat{\pi}_{F^{10}*_2}(60)$ provided by the second resample (in step 700).

Repeating the extractions of the resample for J=1000 times, as many estimates of the power will be obtained in order to provide the bootstrap distribution for the power with m=60, on the basis of the guide sample of n=10 elements.

The system will, for example, obtain the following results $$\hat{\pi}_{F^{10}*_1}(60) = 18.6\%, \hat{\pi}_{F^{10}*_2}(60) = 87.3\%, \ldots,$$
$$\hat{\pi}_{F^{10}*_{332}}(60) = 0\%, \ldots,$$

$$\hat{\pi}_{F^{10}*_{998}}(60) = 100\%, \hat{\pi}_{F^{10}*_{999}}(60) = 100\%,$$
$$\hat{\pi}_{F^{10}*_{1000}}(60) = 90.8\%.$$

Figure 6:
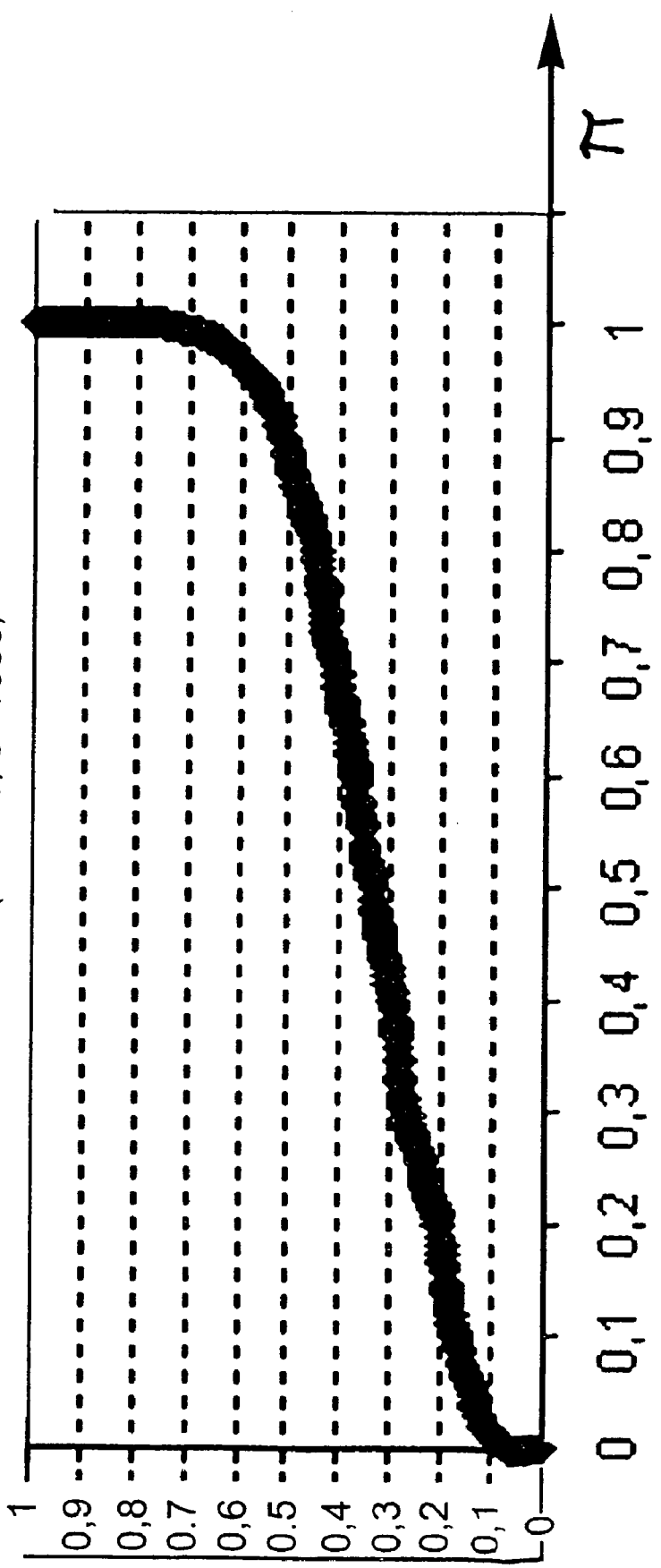
FIG. 6 shows the cumulated distribution function of the distribution of the power values calculated using a first set of calculation parameters.
Figure 7:
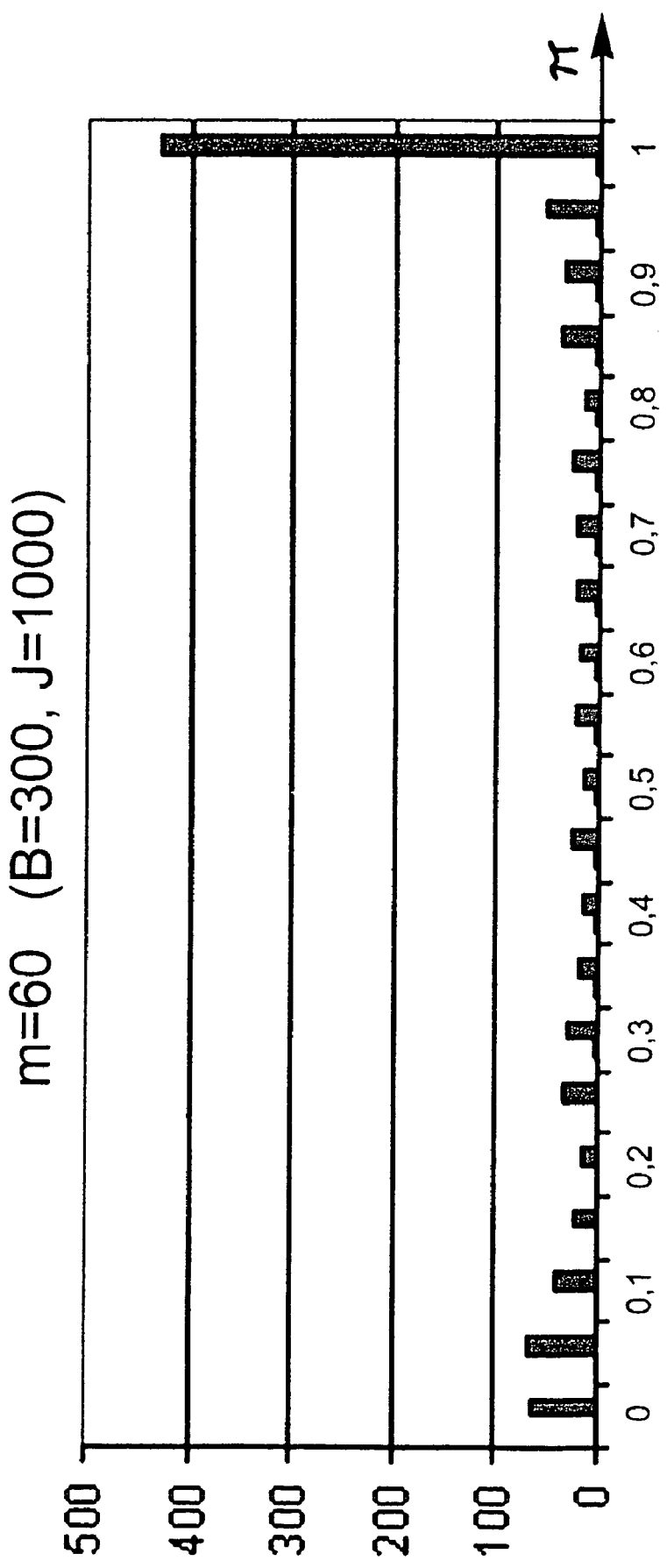
FIG. 7 shows the histogram of the distribution function in FIG. 6.

FIG. 6 shows the cumulated distribution function (approximated from 1000 Monte, Carlo estimates) of the bootstrap distribution of the power values and FIG. 7 shows the corresponding histogram with amplitude classes of 0.05 obtained with B=300 and J=1000.

The lower bound, with a CI having a 20% confidence level for m=60, obtained in the example in step 800 using the percentile bootstrap method, would be the 400$^{th}$ (400=1000×80%/2) of the 1000 data ranked in increasing order, and therefore:

$$(MC, p-tile)\hat{\pi}_{F10,l}^{80\%}(60) = 66.5\%$$

Figure 8:
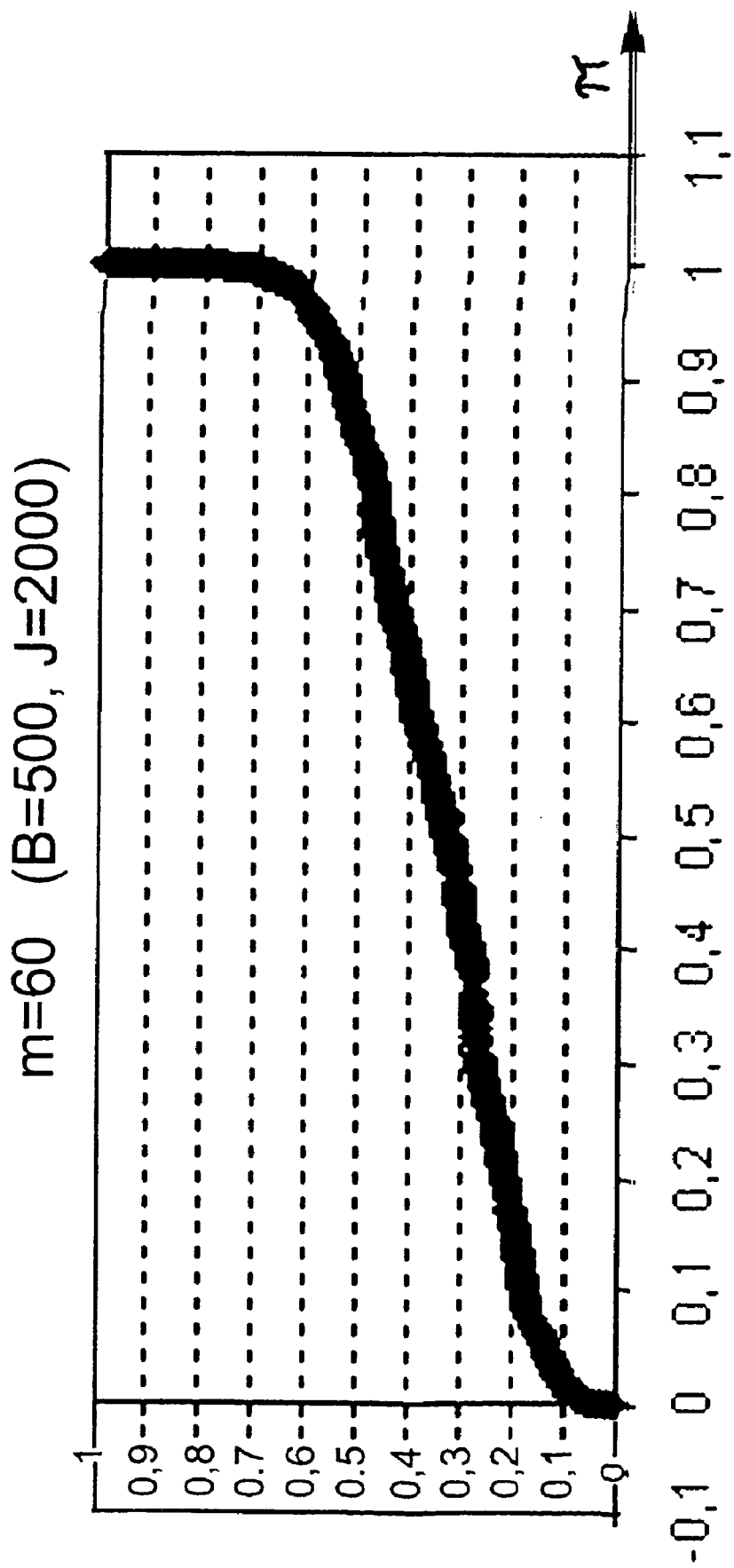
FIG. 8 shows the cumulated distribution function of the distribution of the power values calculated using a second set of calculation parameters.
Figure 9:
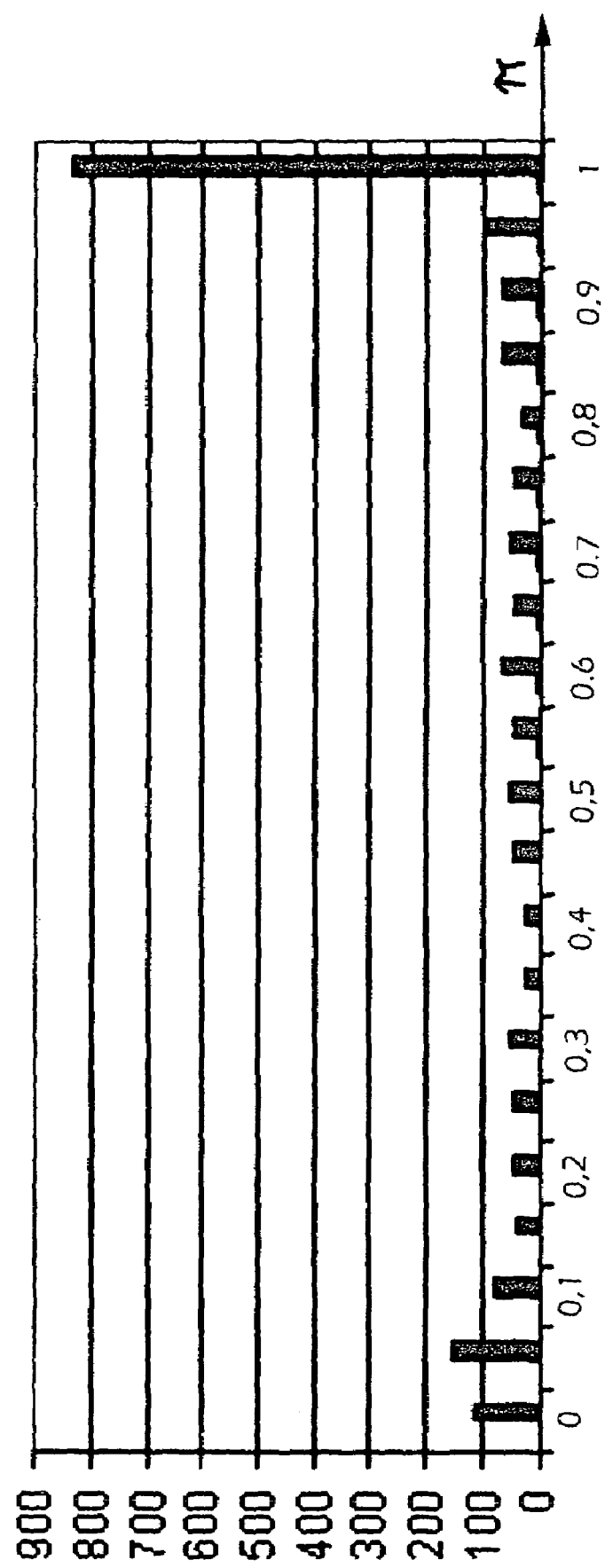
FIG. 9 shows the histogram of the distribution function in FIG. 8, FIGS. 10 and 11 are graphs showing curves for pointwise and interval estimates of the calculated power as a function of sample size.

Attempting to increase the calculation parameters in order to improve accuracy, with B=500 and J=2000 the graphs for the bootstrap distribution prove to be very similar, as will be seen in FIG. 8 and FIG. 9.

In step 900 the system establishes, from a comparison with the preset lower bound (set, for example, by an operator as a specific for the production process), that it is necessary to increase m still further (step 1000) in order to obtain a lower bound for the power which is greater than 80%.

Figure 10:
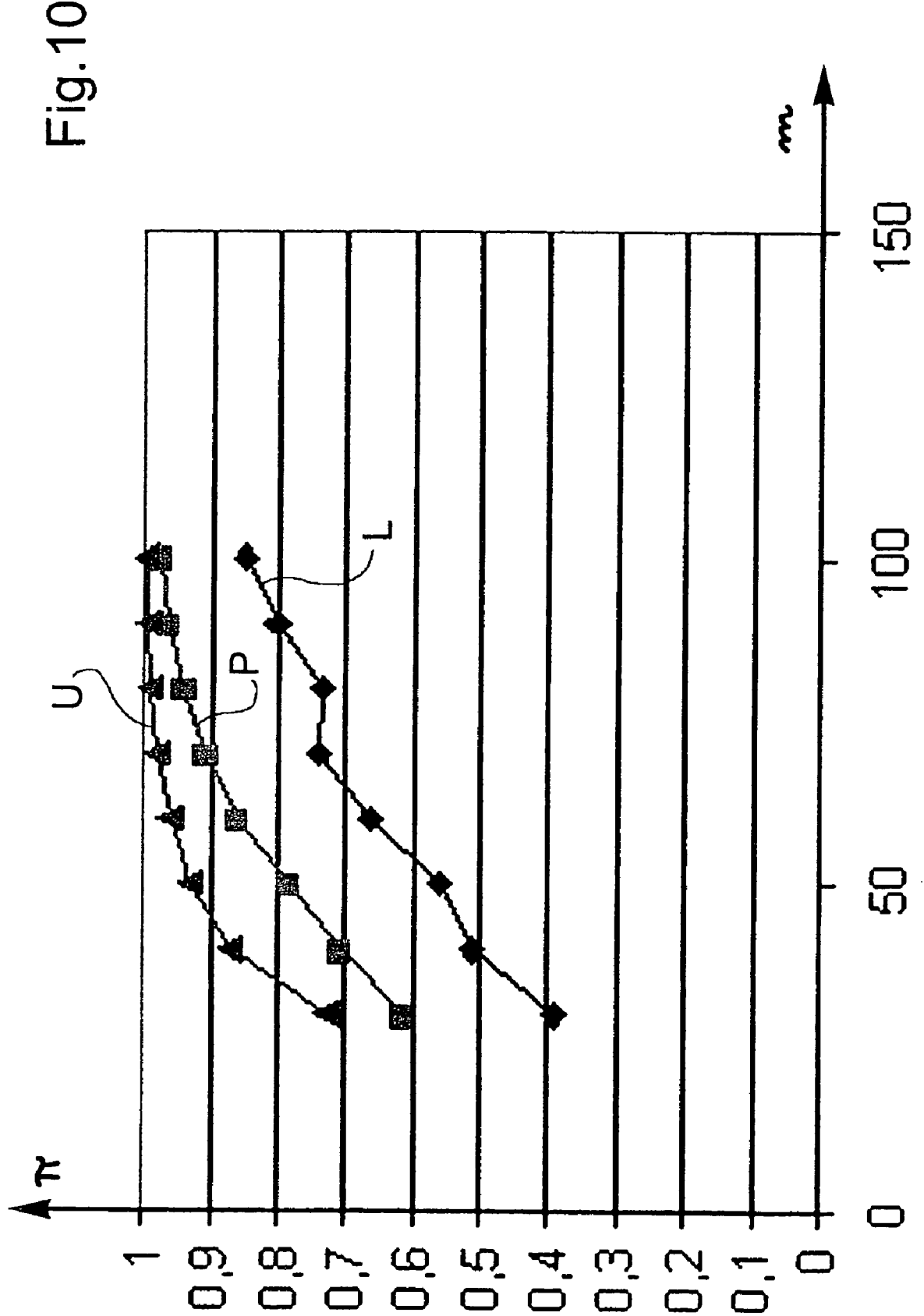

FIG. 10 shows the evolution in the pointwise estimate P of the power, the lower bound L and the upper bound U in relation to sample size, with two-directional CI with a confidence level of 20% with m increasing from 30 to 100, in steps of 10. The evolution in the lower bound of 40% (curve L) and the upper bound of 60% (curve U) with increasing m will therefore be noted. In this case the estimate proves to be rather variable in that n=10 elements of the pilot sample is a relatively small number. It is also necessary to consider the variability in the Monte Carlo method used with J=2000 and B=500.

The result, setting a desired lower bound of 80%, appears to be approximately equal to 90:

$$m_{10,80\%}(80\%) \approx 90$$

Figure 11:
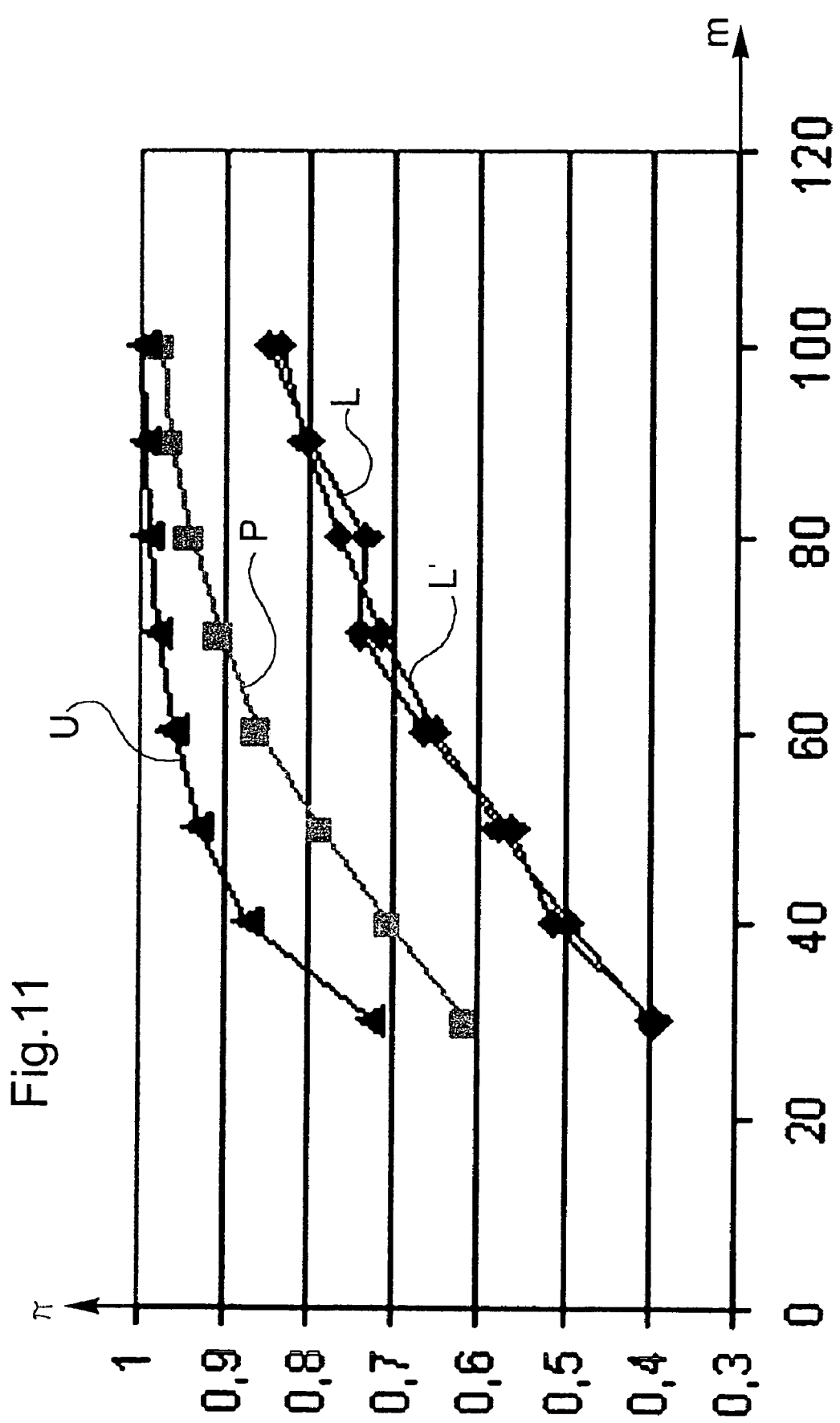

Interpolating on the line for the lower bound, for example using a parabolic model, it is possible to obtain an approximate estimate (curve L'), as shown in FIG. 11:

$$M_{10,80\%}(80\%) \approx 89$$

Of course, if the preselected value of m had made it possible to satisfy the preset lower bound, the system would have reconstructed the evolution in the lower bound and upper bound with decreasing m, in order to determine the minimum sample size required.

This analysis can be carried out using any of the methods known in the art to determine the minimum m such that the constraint on the lower bound is satisfied.

Once m has been determined, in the next step 1100 the system will acquire m data for the observed variable (that is, in the case in point, for the synthesis of m doses of drug and the acquisition of data from m patients to whom the drug is administered).

Carrying out the statistical tests on these data (step 1200) will provide the result which will enable the system to accept the specified process settings (Φ=1) or to change those settings (Φ=0) and therefore repeat the statistical analysis mentioned above.

Of course, interpretation of the flow chart in the case of the quality control application must be adapted to the specific test carried out, the outcomes for which are mentioned in the introduction to this description. Thus, without any changes in steps 100–1100, in step 1200 the statistical test for conformance of the production batch will produce an outcome Φ=1 if the batch fails to conform, and the negative outcome Φ=0 in other cases.

The system will apply feedback control which is different from the example illustrated in detail, where if Φ=1 the batch will be discarded or the production process will be stopped, while if Φ=0 the batch will be accepted or the production process will not be stopped. Under particular conditions (for example excessive frequency of occurrence), the conclusion that the batch is not conforming will result in adjustment of the process parameters, for example, to recover any deviation. The condition that the batch is conforming will merely result in a return to step 200 and the repetition of steps 200–1200 in the process according to the invention.

The example described has concluded with the result that the sample size estimated on the basis of 10 data for the pilot sample is 90. However there is nothing to prevent further pilot sample data (for example a further 10 data) from being obtained, and estimating the sample size on the basis of the total number of observations (20 observations).

Narrower confidence intervals will be obtained for the power and as a consequence the estimated sample size in this second stage will be less than 90.

The method can be applied sequentially so as to arrive at convergence between the number of pilot size data and the estimated sample size. This being the case, a stable statistical decision is obtained with n pilot sample data and at the same time the sample size estimate will conclude that precisely n observations will be needed in order to obtain the predetermined stability. The process of producing information can therefore be stopped, that is no further data will be sampled and the data initially considered to be the pilot sample will be regarded as the data for the observed variable and the statistical test will be carried out on these.

The algorithm described has a firm theoretical basis because of the fact that the estimator $\hat{\pi}_{F^n}$ for the power, obtained by plugging in the empirical distribution function $F^n$, is a V-statistic.

For applying the method to quality control it is useful to assume that the F distribution has as indices a parameter γ∈R, for example the mean or the variance, (relating, for example, to the diameter of a product in a production batch), or in a two-dimensional context the correlation coefficient ρ (relating for example to the link between the efficiency of a process and a particular process parameter). F=F(γ) or more briefly $F_\gamma$ will be considered and as a consequence the power curve will be evaluated, that is the power $\pi_{F_\gamma}(m)$ not only as a function of m, but also as a function of γ:

$$E_{F\gamma}[\Phi_\alpha(X_m)] = \pi_{F\gamma}(m)$$

Once m has been fixed, the more this curve increases, the more the values of γ provide indexes for $F_\gamma$ distributions which are "far from" the distributions in $F_0$, that is, for example, the more the mean diameter of the products present in a batch "is far from" the preset value.

Through this information an operator can assess the sensitivity of the statistical test instrument: with a particular value of γ, and with Fγ below $H_1$ (for example the batch will not be conforming because the mean product diameter has a value γ greater than the maximum diameter permitted by the specifications), there will be some probability of finding the test significant (in the example, the batch is not conforming). With another γ'>γ the probability will be increased to some extent; in the example, the more the diameter γ increases the more the statistical test will have the probability of determining that the batch is not conforming.

If $F_\gamma$ is known there are no problems, apart from computational ones, in calculating and displaying $\pi_{F_\gamma}(m)$. On the other hand, if $F_\gamma$ is not known, either wholly or in part, will be necessary an estimate of it, which in any event keeps the characteristic of interest unchanged, that is keeps $\gamma$ fixed. For example, assuming that $\gamma$ is the mean $\mu$, and then wishing to fix the mean $\mu$ in an estimated distribution $F''$, $F''$ will be constructed from a sample estimate based on a sample $X_1, \ldots, X_n$. Applying the transformation $X_1 - \overline{X} + \mu, \ldots, X_n - \overline{X} + \mu$ to the sample $X_1, \ldots, X_n$, $F_\mu''$ which has $\mu$ as its mean will be obtained. In this way the shape parameters of $F''$ are maintained unchanged, but it is "translated" into a position such that the resultant mean is $\mu$ instead of the $\overline{X}$ which would be obtained merely from the preceding data $X_1, \ldots, X_n$.

Once $F_\gamma''$ has been obtained from a pilot sample, the pointwise estimate of the power is derived as described above. As the estimate is obtained for every $\gamma$, an estimated power curve is obtained as a function of $\gamma$, that is $\hat{\pi}_{F_\gamma''}(m)$.

Application of the process according to the invention comprises calculating a confidence interval for $\pi_{F_\gamma''}(m)$. Following what is described in part B of the algorithm (calculation of the bootstrap distribution), replacing $F_\gamma''$ for $F'''$ the desired result is obtained as $\gamma$ is varied and lower and upper bounds are obtained for the power curve for any test with one sample for which the following relationship is respected:

$$P\left(\pi_{F_\gamma(m)} \in \left[\hat{\pi}_{F_\gamma''}^{\alpha 1, l}(m), \hat{\pi}_{F_\gamma''}^{\alpha 1, u}(m)\right]\right) = 1 - \alpha 1$$

Figure 12:
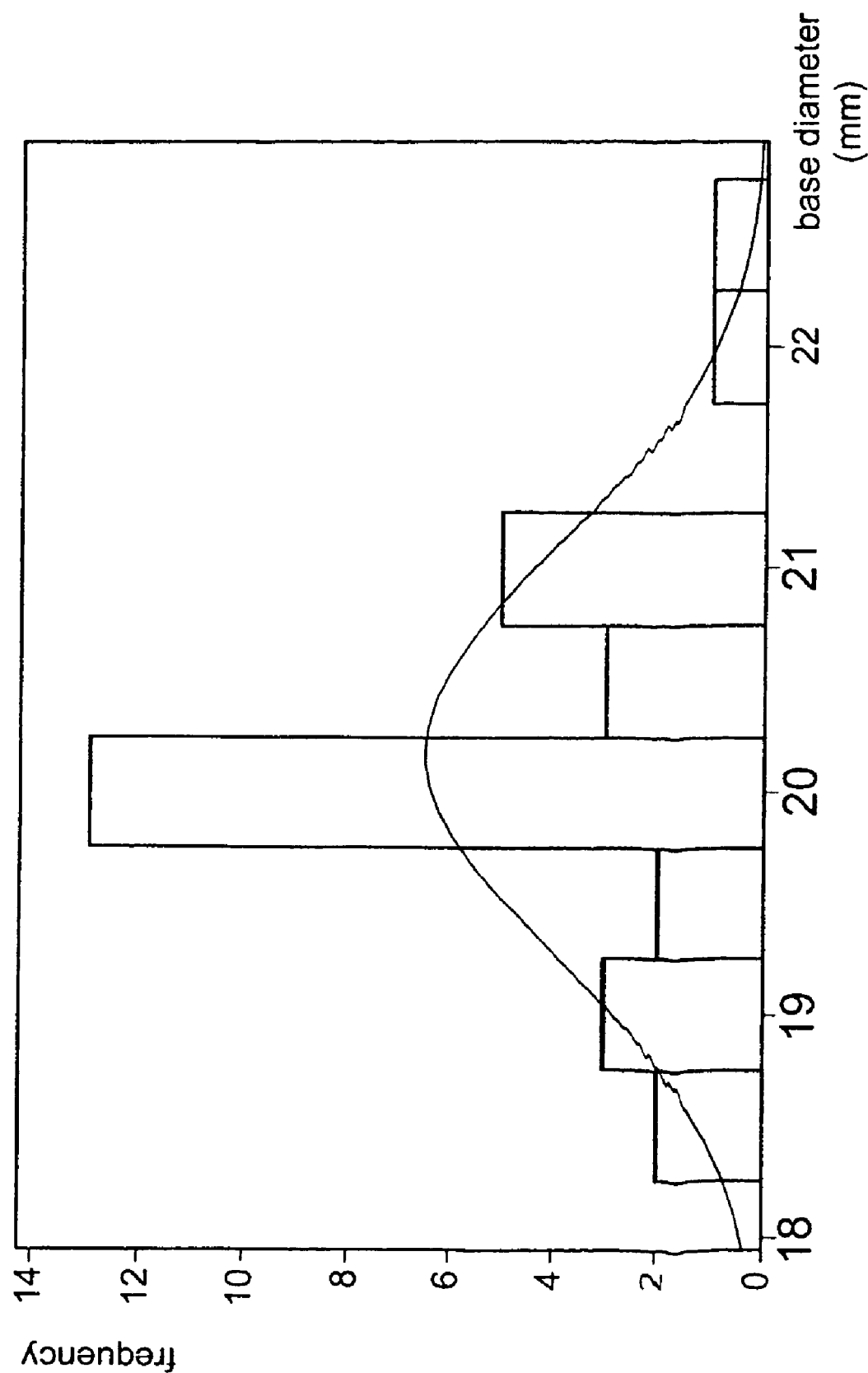
FIGS. 12 and 13 are graphs showing the distribution of an observed variable in the context of quality control—actual or standardised and rendered symmetrical respectively.

Providing an example of an application of the method object of the invention in the field of quality control, it is assumed that the production of steel cylinders is being controlled through observing their base diameters. It is assumed that an output of 30 steel cylinders has been observed with a stated mean of 20 mm for the base diameter and a "not very Gaussian" sample distribution (see FIG. 12). It is then desired to prepare a Control Chart based on the statistical test for which $H_0: \mu = 20$ and $\alpha = 0.1$. The effectiveness of this Chart for a particular divergence of production from the preset mean of $\mu = 20$ mm must therefore be evaluated using a suitable Characteristic Operative Chart (COC), which shows the evolution in the error $\beta$ (in the ordinate) as the test parameter (for example the mean, plotted as the abscissa) changes, for a preset error $\alpha$, in relation to the various sample sizes m.

Figure 13:
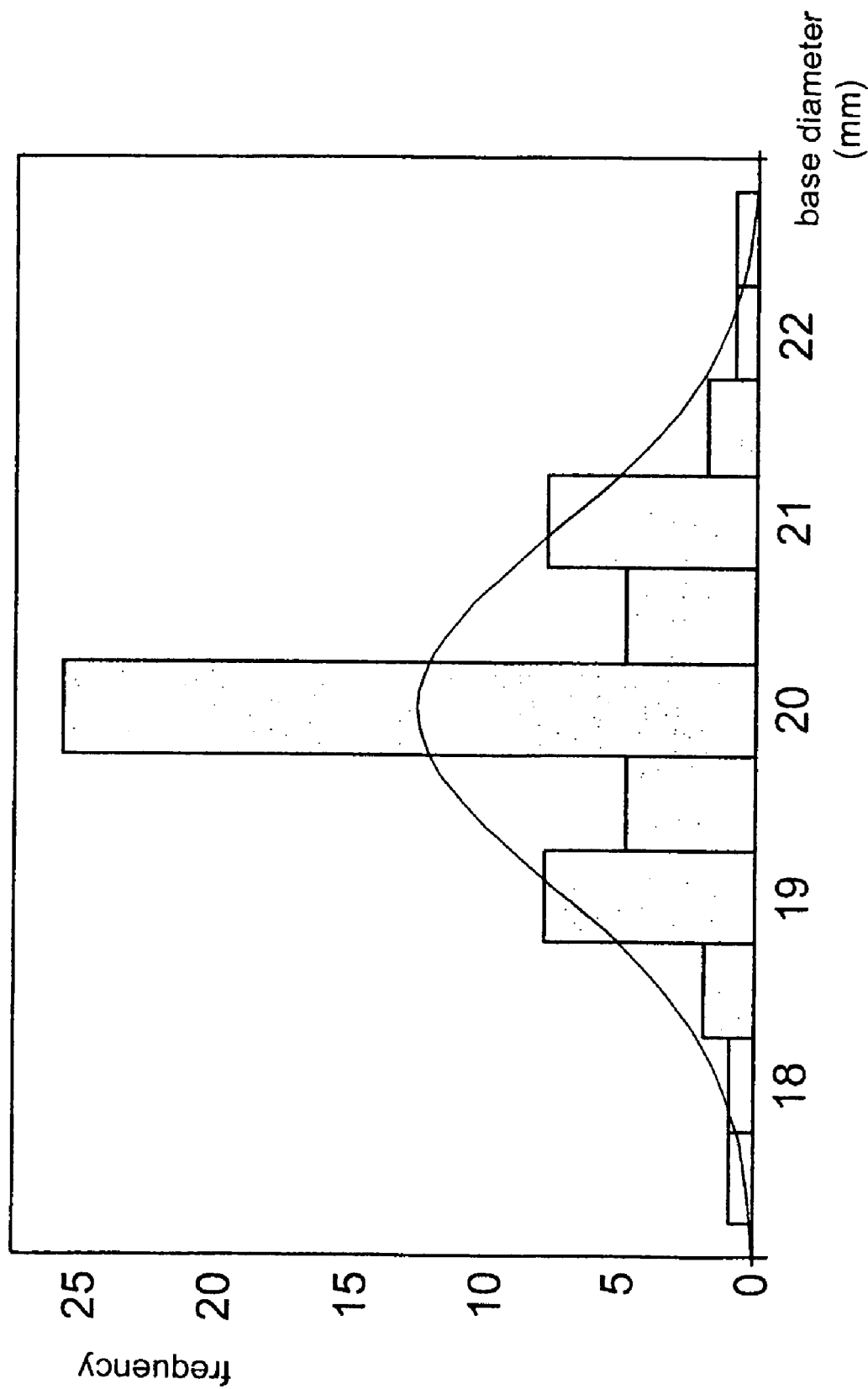

Firstly, in order to comply with the model, the empirical distribution is made symmetrical with respect to the value $\mu = 20$ mm, obtaining the distribution shown in FIG. 13, and the power curves are determined as described.

Figure 14:
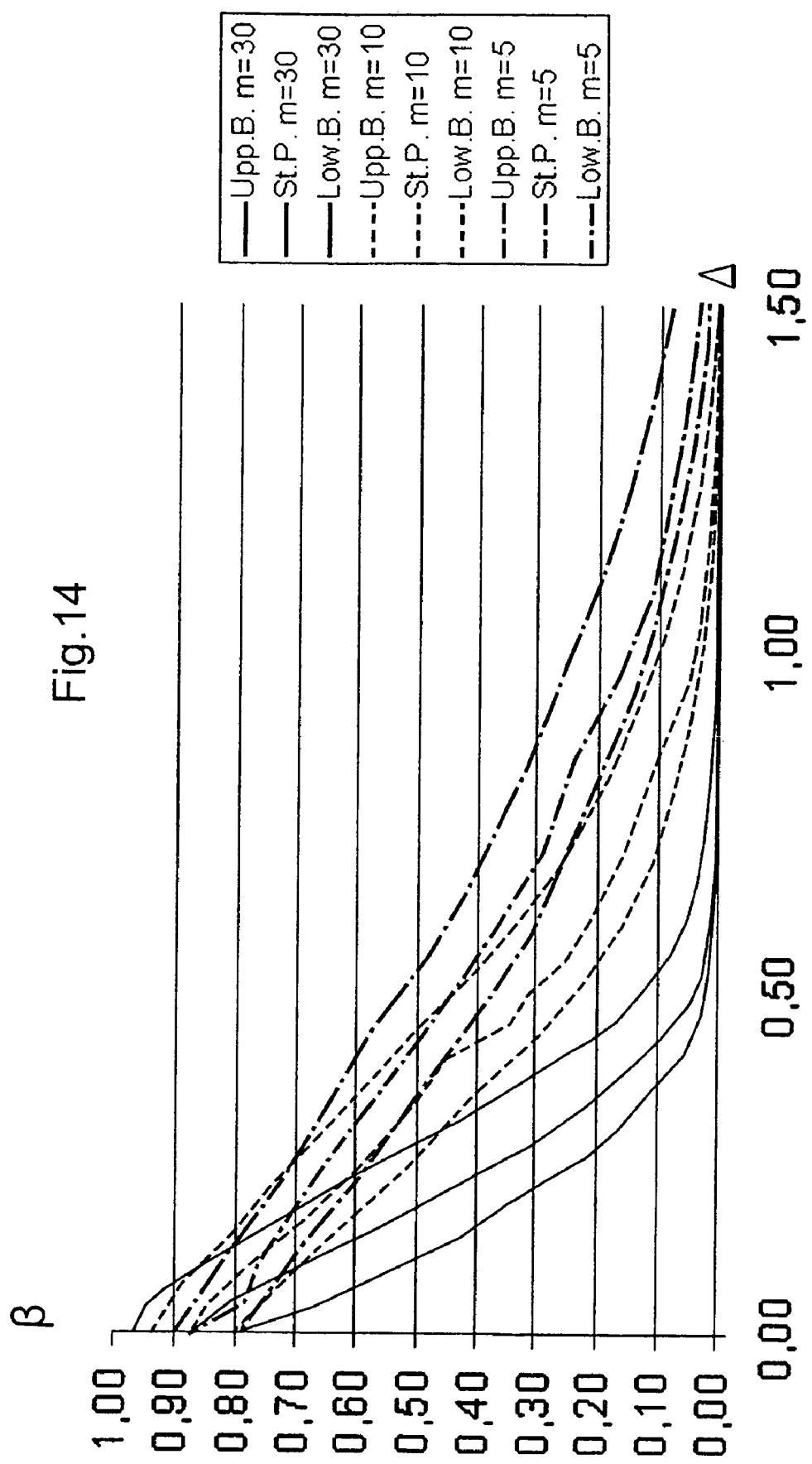
FIG. 14 is a graph of a Characteristic Operating Chart.

As the divergence from the mean (indicated by $\Delta$) increases from 0 to 1.5 mm, the Confidence Intervals for the error $\beta$ are calculated for m=5, m=10 and m=30, on the basis of a sample size n=30, mentioned in the previous paragraph. The curves for the confidence regions are shown in FIG. 14, in which the curves for the lower bound, the pointwise estimate and the upper bound are shown in the direction of increasing $\beta$ for a sample size m=30 (continuous line), m=10 (dashed line), and m=5 (dashed and dotted line). In practice a COC is obtained for a non-parametric Control Chart.

Because the COC shows the limits of the error $\beta$, that is the complement to 1 of the power, the upper bound for the same must be taken into consideration. If for example it is wished to design a Control Chart with $\beta \approx 20\%$ to discover divergences of more than 0.5 mm from the 20 mm mean, m=30 observations will be required. If it is desired to discover the same deviations with an error of $\beta \approx 50\%$, m=5 will be sufficient. In order to find deviations of 1 mm from the mean, for the same power, fewer observations will be needed: $\beta \approx 20\%$ is obtained with m=5–6 observations, and with m=10 $\beta \approx 10\%$ is obtained.

Other empirical distribution functions other than $F''$ may in practice be used to apply the plug-in, thus obtaining other estimators through which the pointwise estimate of the power can be obtained and Confidence Intervals for the power can be calculated.

One possibility consists of using a smoothed empirical distribution function $F''^{,s}$ (smoothed), defined for example by assigning a uniform mass to the intervals between two successive measurements, and adding two masses to the bounds. Let $X_{(1)} \leq X_{(2)} \circ \ldots \leq X_{(n)}$ be the ordered elements of the pilot sample, to which are added a minimum $X_{(0)} = 2X_{(1)} - X_{(2)}$ and a maximum $X_{(n+1)} = 2X_{(n)} - X_{(n-1)}$. The following density is therefore obtained for such an $F''^{,s}$:

$$f^{n,s}(t) = \frac{1}{n+1} \sum_{i=0}^{n} I_{\{(X_{(i)}, X_{(i+1)})\}}(t) \frac{1}{X_{(i+1)} - X_{(i)}}$$

Another possibility consists of using semi-parametric models, through which some characteristics of a specific model are imposed on the empirical distribution function. For example, it may be desired that the distribution is symmetrical with respect to a predetermined value $\mu$. The n symmetrical elements with respect to $\mu$ obtained from the guide sample will then be $X_{n+i} = 2\mu - X_i$ with $i=1, \ldots, n$:

$$F_\mu^n(t) = \frac{1}{2n} \sum_{i=1}^{2n} I\{X_i \leq t\}$$

is therefore obtained.

As a further example, the two approaches mentioned can be applied simultaneously, obtaining a smoothed and symmetrical empirical distribution function. Once $X_{n+i} = 2\mu - X_i$ have been defined for $i=1, \ldots, n$ and the same ordinate values have been defined and ordered for $X_{(1)} \leq X_{(2)} \leq \ldots \leq X_{(2n)}$, the minimum $X_{(0)} = 2X_{(1)} - X_{(2)}$ and the maximum $X_{(2n+1)} = 2X_{(2n)} - X_{(2n-1)}$ are defined and the density of this empirical distribution function is obtained:

$$f_\mu^{n,s}(t) = \frac{1}{2n+1} \sum_{i=0}^{2n} I_{\{(X_{(i)}, X_{(i+1)})\}}(t) \frac{1}{X_{(i+1)} - X_{(i)}}$$

In the example which follows, the smoothing technique to calculate the empirical distribution function is applied to the data in the preceding examples, with reference to a model having a symmetrical distribution. Thus rendering the guide sample data symmetrical with respect to the Hodges-Lehmann estimate, which is $$\mu_{HL}^n = \text{med}\left\{\frac{X_i + X_j}{2} 1 \leq i, j \leq n \; i \neq j\right\} = 1$$

the following data are obtained −8,1, −6,1, −5,1, −1,5, 0,1, 1,2, 2,1, 3,5, 7,1, 8,1, 10,1, to which the minimum −10 and the maximum 12 are added.

Figure 15:
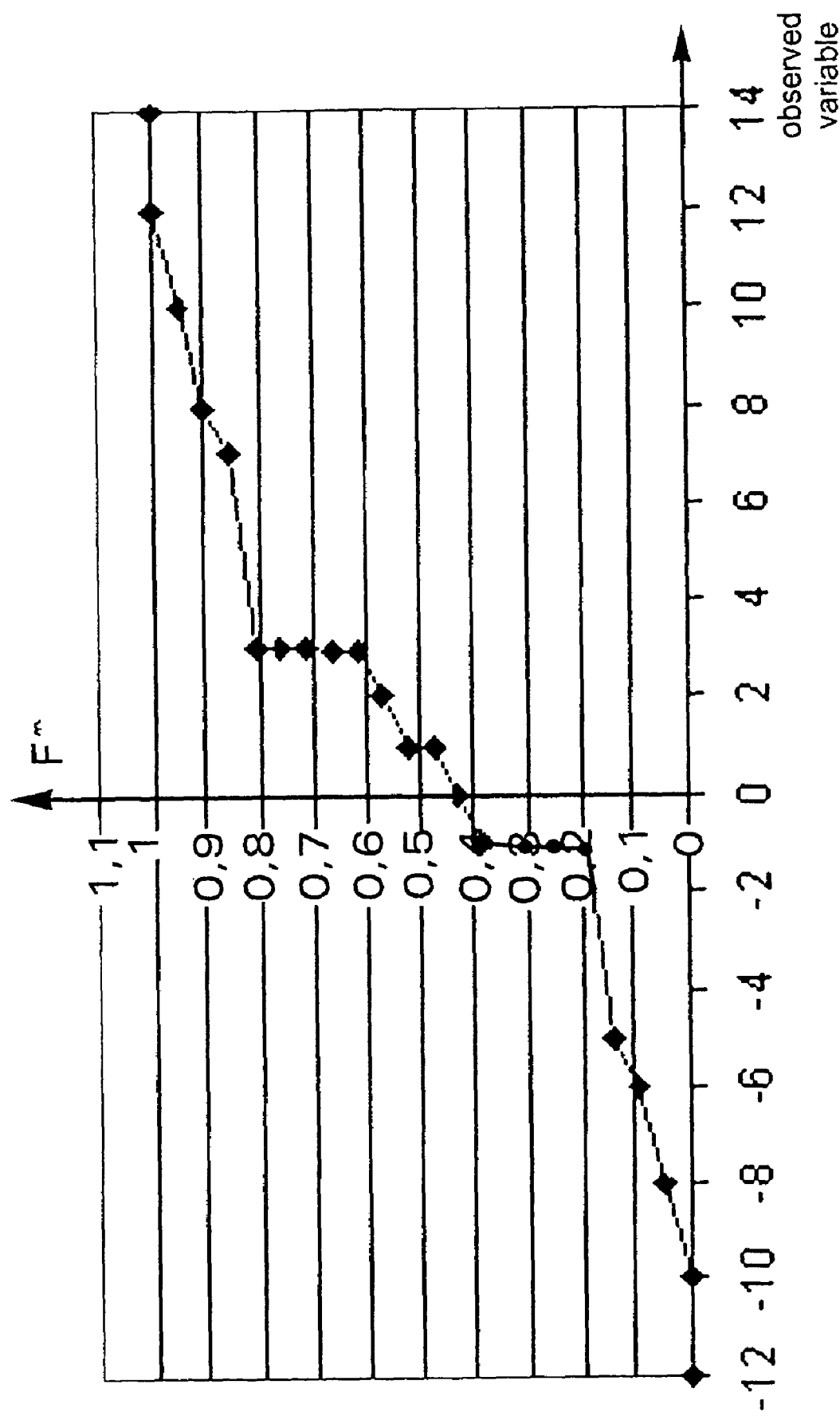
FIG. 15 is a graph showing the shape of a smoothed empirical distribution function.

In order to prevent repeated observations (ties), the repeated data can be distributed symmetrically about the original datum, adding or subtracting an infinitesimal value, in this case equal to 0.01. The following data −10, −8, −6, −5, −1.02, −1.01, −1, −0.99, −0.98, 0, 0.99, 1.01, 2, 2.98, 2.99, 3, 3.01, 3.02, 7, 8, 10, 12, that is 22 items of data, are therefore obtained, and these ultimately give rise to the smoothed empirical distribution function shown in FIG. 15, assigning uniform probabilities of 1/21 to the intervals between the items of data.

$\alpha$=0.05 and 1−$\beta$=80% are fixed as in the previous examples. In order to calculate the sample size based on the pointwise estimate of the power (curve P in FIG. 16 and corresponding parabolic interpolation) m is increased to obtain a power estimate of 80% and $m_{10}(0.8)$=140 is obtained.

If instead it is desired to use the lower bound for the power, in a precautionary way, and as previously having fixed a CI at a level of 20%, using the percentile bootstrap algorithm the lower bound (curve L) and the upper bound (curve U) shown in FIG. 17 are obtained as m increases.

These confidence limits are however rather variable with increasing m, in that n=10 and B=300 and J=1000 were used. The curve L for the lower bound with a parabolic model is therefore interpolated, obtaining the curve L' again shown in FIG. 17, and this is used to determine the sample size required to satisfy the constraint on the power:

$$m_{10,80\%}(80\%)=315$$

Because confidence intervals for the power are obtained through this invention by having resort to bootstrap methods, it is necessary to emphasise that the bootstrap does not provide a single calculation solution, but many. A person skilled in the art will therefore know to vary the bootstrap techniques to obtain different Confidence Intervals, and to use other techniques not listed in the paragraphs above, but always relating to the bootstrap approach to approximate the distribution for the V-statistics.

The estimate of the power of a test which has just been carried out is indicated by the definition "post-hoc power" and this is performed in step 1300.

If it is desired to provide a confidence interval for the power of a test which has just been performed, that is on the basis of the sample available, of size n, this interval is obtained by providing a lower bound and an upper bound (with a procedure similar to and symmetrical with calculation of the lower bound) following one of the procedures previously described and having set m=n. In this case in fact the supporting theory is based on the fact that the size of the kernel for the V-statistic has been fixed to be n.

The confidence interval comprises a pair of random bounds, for which:

$$P\left(\pi(n) \in \left[\hat{\pi}_{F^n,l}^{\alpha 1}(n), \hat{\pi}_{F^n,u}^{\alpha 1}(n)\right]\right) = 1 - \alpha 1$$

is obtained.

It will be noted that the lower bound having a right unilateral confidence index of α1 acts as the upper bound.

One of the methods described above is used to calculate the upper and lower bounds.

The processing carried out so far can be extended to the situation of statistical tests with several samples.

It is assumed that the F distribution in fact relates to the distributions of K populations, and is therefore F=($F_1, \ldots, F_K$). From the $k^{th}$ population there will therefore be a sample of size $m_k$: $X_{k1}, \ldots, X_{km}$, k=1, ..., K. The $\Phi_\alpha$ test will be a function of the $m=m_1+m_2+ \ldots +m_K$ elements and the power will be the mean for the test:

$$\pi_F(m)=E_{(F_1, \ldots, F_k)}[\Phi_\alpha(X_{11}, \ldots, X_{1m_1}; \ldots, \ldots; X_{K1}, \ldots, X_{Km_K})]=1-\beta$$

Again in this case each observed variable $X_{ki}$ may be a multivariate datum, that is in $R^p$.

It is assumed that there is a predetermined percentage division of the data into the k groups, that is a vector $p_1, \ldots p_K$ is predetermined such that $\Sigma p_k$=1 and $p_k$>0. The number of groups, $m_k$=$[p_k m]$+1 can be obtained from this. The definition of the sample size m(1−$\beta$) is the same.

Let F not be known and, as a consequence, the sample size m in relation to the desired power (1−$\beta$) is not calculable. Thus one sample is available for each population $X_{k1}, \ldots, X_{km_k}$, representative of the $F_k$ law, from which $F_k^{n_k}$ is obtained with k=1, ..., K. The overall empirical distribution function is indicated by $F^n$=($F_1^{n_1}, \ldots, F_K^{n_K}$).

A pointwise estimate of the power is obtained using the plug-in:

$$\pi F^n(m)=E_{(F_1^{n_1}, \ldots, F_F^{n_K})}[\Phi_\alpha(X_{11}^*, \ldots, X_{1m_1}^*; \ldots; \ldots; X_{K1}^*, \ldots, X_{Km_K}^*)]$$

where the generic $X_{ki}^*$ is a random item of data extracted from $F_k^{n_k}$. This formulation is equal to $$\frac{1}{n_1^{m_1}} \cdots \frac{1}{n_K^{m_K}} \sum_{i_{11}=1}^{n_1} \cdots \sum_{i_{1m_1}=1}^{n_1} \cdots \sum_{i_{KJ}=1}^{n_K} \cdots \sum_{i_{Km_K}=1}^{n_K} \Phi_\alpha(X_{1i_{11}}, \ldots, X_{1i_{1m_1}}; \ldots; \ldots; X_{Ki_{KJ}} X_{Ki_{Km_K}})$$

and proves to be a generalised V statistic.

The same considerations as mentioned for the test apply to a sample: with a pointwise estimate there is a tendency to underestimate the power of the test and it is therefore desirable to calculate a lower bound for the power.

The bootstrap can then be applied to the generalised V-statistics to obtain a general solution which provides the lower bound for the power for any test with K samples.

By analogy to the test with one sample, the bootstrap confidence intervals for the power are calculated on the basis of the pointwise estimate $\hat{\pi}_{F^n}(m)$ and the distribution $\hat{\pi}_{F^n}^*(m)$, which may be approximated using a Monte Carlo method. The algorithm is as follows:

Part A—Pointwise estimate of the power $\hat{\pi}_{F^n}(m)$ 1.1) a random sample $X_{11}^*, \ldots, X_{1m_1}^*$ of size $m_1$ is taken, with replacements, from the pilot sample of size $n_1$ available originating from $F_1$.

1.K) a random sample $X_{K1}^*, \ldots, X_{Km_K}^*$ of size $m_k$ is taken, with replacements, from the pilot sample of size $n_K$ available originating from $F_K$.

2) the test $\Phi_\alpha(X_{11}^*, \ldots, X_{1m_1}^*; \ldots; \ldots; X_{K1}^* \ldots, X_{Km_K}^*)$ is calculated 3) the K+1 preceding steps (from 1.1 to 1.K and 2) are repeated a B number of times (e.g. B=1000) and the percentage of tests which yielded an outcome of 1 is counted.

This percentage, $_{MC}\hat{\pi}_{F^n}(m)$, is a Monte Carlo approximation to the pointwise estimate for the power of the test $\hat{\pi}_{F^n}(m)$.

Part B—Calculation of the bootstrap distribution for $$\hat{\pi}_{F^n}*(m)$$

1.1) a random sample $X_{11}^*, \ldots, X_{1n_1}^*$ of size $n_1$ is taken, with replacements, from the pilot sample of size $n_1$ available, originating from $F_1$.
. . .
1.K) a random sample $X_{K1}^*, \ldots X_{Kn_K}^*$ of size $n_K$ is taken, with replacements, from the guide sample of size $n_K$ available, originating from $F_K$.
2.1) a random sample $X_{11}^{}, \ldots, X_{1m_1}^{}$ of size $m_1$ is taken, with replacements, from the "resampling" sample $X_{11}^*, \ldots, X_{1n_1}^*$.
. . .
2.K) a random sample $X_{K1}^{}, \ldots, X_{Km_K}^{}$ of size $m_K$ is taken, with replacements, from the "resampling" sample $X_{K1}^*, \ldots, X_{Kn_K}^*$.
3) the test $\Phi_\alpha(X_{11}^{}, \ldots, X_{1m_1}^{}; \ldots; X_{K1}^{}, \ldots X_{Km_K}^{})$ is calculated.
4) the preceding K+1 steps are repeated (from 2.1 to 2.K and 3) a B number of times (e.g. B=1000) and the percentage of tests giving an outcome of 1 is counted. This percentage $\hat{\pi}_{F^{n*}_j}(m)$ is a point on the bootstrap distribution for the power of the test.
5) a return is made to step 1.1 a J number of times (e.g. J=1000), finally yielding $\hat{\pi}_{F^{n*}_1}(m), \hat{\pi}_{F^{n*}_2}(m), \ldots, \hat{\pi}_{F^{n*}_J}(m)$, and thus providing J points for the bootstrap distribution.

Part C—Calculation of the percentile and the lower bound 1) the J points obtained in part B are ranked in increasing order and, having previously sent $\alpha 1$, the $J \cdot (1-\alpha 1/2)^{th}$ of the ordered data is taken as $\hat{\pi}_{F^n}*(m)_{(1-\alpha 1/2)}$, which is defined as $_{MC}\hat{\pi}_{F^n}*(m)_{(1-\alpha 1/2)}$
2) the lower bound for the power is obtained from the percentiles calculated as in the previous step, used in a different way according to the different bootstrap method which it has been decided to apply: Bootstrap-"t", Bootstrap Percentile, BCa or another.

If pilot samples are only available from H<K populations, the bootstrap CI for the power of the test can be calculated in the same way. Without any loss of generality we will assume that the samples of the first H populations $F_1, \ldots, F_H$ are known.

One method consists of making estimates of $F_{H+1}, \ldots, F_K$ on the basis of the other H pilot samples and on the basis of specific distribution assumptions. For example if K=2 in circumstances in which only one sample of size $n_1$ is known from $F_1$, if it is assumed that the shape of $F_2$ is the same as $F_1$ and that only its position changes, and also a known displacement $\eta$ is imposed, the distribution function generated from $X_{2i}=X_{1i}+\eta$, with i=1, \ldots, $n_1$, can be taken as $F_2^{n_2}$, from which $n_2=n_1$. The same algorithm as above can be applied in this case.

Another way consists of considering $F_{H+1}, \ldots, F_K$ as being known, and assigning any shape of-distribution to them. In this case there may be various calculation procedures, including analytical procedures as mentioned for the test with one sample. In addition to this the Monte Carlo method can be applied, and the algorithm described above becomes simplified in parts A and B as follows:

Part A—Pointwise estimate for the power $\hat{\pi}_{F^n}(m)$ 1.1) a random sample $X_{11}^*, \ldots, X_{1m_1}^*$ of size, $m_1$ is taken, with replacements, from the pilot sample of size $n_1$ available originating from $F_1$.
. . .
1.H) a random sample, $X_{H1}^*, \ldots X_{Hm_H}^*$ of size $m_H$ is taken, with replacements, from the pilot sample of size $n_H$ available originating from $F_H$.
1.H+1) a random sample $X_{H+1,1}, \ldots, X_{H+1,m_{H+1}}$ of size $m_{H+1}$ is taken, with replacements, from the known distribution $F_{H+1}$.
. . .
1.K) a random sample $X_{K1}, \ldots X_{Km_K}$ of size $m_K$ is taken, with replacements, from the known distribution $F_K$.
2) the test $\Phi_\alpha(X_{11}^*, \ldots, X_{1m_1}^*; \ldots; X_{H1}^*, \ldots, X_{Hm_H}^*; X_{H+1,1}, \ldots, X_{H+1,m_{H+1}}; \ldots; X_{K1} \ldots, X_{Km_K})$ is calculated
3) the preceding K+1 steps are repeated (from 1.1 to 1.K and 2) a B number of times (e.g. B=1000) and the percentage of tests yielding an outcome of 1 is counted. This percentage, $MC\hat{\pi}_{F^n}(m)$, is a Monte Carlo approximation to the pointwise estimate of the power of the test $\hat{\pi}_{F^n}(m)$.

Part B—Calculation of the bootstrap distribution for $\hat{\pi}_{F^n}*(m)$ 1.1) a random sample $X_{11}^*, \ldots, X_{1n_1}^*$ of size $n_1$ is taken, with replacements, from the pilot sample of size $n_1$ available originating from $F_1$.
. . .
1.H) a random sample $X_{H1}^*, \ldots, X_{Hn_H}^*$ $n_H$ in size is taken, with replacements, from the pilot sample of size $n_H$ available originating from $F_H$.
2.1) a random sample $X_{11}^{}, \ldots, X_{1m_1}^{}$ of size $m_1$ is taken, with replacements, from the "resampling" sample $X_{11}^*, \ldots, X_{1n_1}^{**}$.
. . .
2.H) a random sample $X_{H1}^{}, \ldots, X_{Hm_H}^{}$ of size $m_H$ is taken, with replacements, from the "resampling" sample $X_{H1}^*, \ldots, X_{Hm_H}^*$.
2.H+1) a random sample $X_{H+1,1}, \ldots, X_{H+1,m_{H+1}}$ of size $m_{H+1}$ is taken, with replacements, from the known distribution $F_{H+1}$.
. . .
2.K) a random sample $X_{K1}, \ldots X_{Km_K}$ in size $m_K$ is taken, with replacements, from the known distribution $F_K$.
3) the test $$\Phi_\alpha(X_{11}^{}, \ldots, X_{1m_1}^{}; \ldots; X_{H1}^{}, \ldots, X_{Hm_H}^{}; X_{H+1,1}, \ldots, X_{H+1,m_{H+1}}; \ldots; X_{K1} \ldots, X_{Km_K})$$

is calculated
4) the preceding K+1 steps are repeated (from 2.1 to 2.K and 3) a B number of times (e.g. B=1000) and the percentage of tests yielding an outcome of 1 is counted. This percentage $\hat{\pi}_{F^{n*}_1}(m)$ is a point on the bootstrap distribution for the power of the test.
5) a return is made to step 1.1 a J number of times (e.g. J=1000), finally obtaining $\hat{\pi}_{F^{n*}_1}(m), \hat{\pi}_{F^{n*}_2}(m), \ldots, \hat{\pi}_{F^{n*}_J}(m)$, and J points for the bootstrap distribution will then be available.

It is also possible to imagine methods other than those described which make use of at least one pilot sample, and where such methods are based on the plug-in of empirical distribution functions through which a distribution of the power estimator is obtained, these are to be regarded as being of the bootstrap family and will therefore fall within the scope of the invention in question.

Whenever $F_k$ is estimated on the basis of a pilot sample the smoothing techniques described previously can be applied.

In a similar way as for the test with one sample, it is interesting to investigate the Power Curve for tests with K samples, which is defined on the basis of a parameter $\gamma \in R$ originating from the overall F function, hence the term $F_\gamma$.

For example, if with K=2 it is assumed that $F_1$ and $F_2$, having the respective means $\mu_1$ and $\mu_2$, are equal taking into account a position parameter, then $\gamma = \mu_1 + -\mu_2$.

Another example: it is assumed that there are K production lines or devices/apparatus of equipment having a limited service life (light bulbs, refrigerators), the survival of which is modelled by an exponential distribution for the parameter $\theta_k$, with k=1, ..., K. It is assumed that, as the production lines are deliberately different, there will be different survivals, and therefore different $\theta_k$, which will nevertheless be linked through a linear relationship $\theta_k = a_0 +$ bk. The F distribution is therefore parameterised by b, and a test for the equality of the $\theta_k$, that is with $H_0$: $\theta_1 = \theta_2 = ... = \theta_k$, will be more powerful (sensitive) the more evident is the difference, that is the higher b is. In this case $\gamma = b$.

If $F_\gamma$ is not known, at least in part, it can be estimated. Going back to the first example, having a sample $X_{11}, ... X_{1n_1}$ from $F_1$ and $X_{21}, ... X_{2n_2}$ from $F_2$, $F_1''$ is obtained in a standard way from $X_{11}, ..., X_{1n_1}$, and by defining $\overline{X}_i$ as the empirical means for the two pilot samples, $F_2''$ is obtained from $X_{21} - \overline{X}_2 + \overline{X}_1 + \gamma, ..., X_{2n_2} - \overline{X}_2 + \overline{X}_1 + \gamma$. $F_\gamma'' = (F_1'', F_2'')$, which consists of two estimated distributions whose means differ in location by precisely a value $\gamma$, is obtained; in fact $F_1''$ has a mean $\overline{X}_1$ while $F_2''$ has a mean $\overline{X}_1 + \gamma$.

Using the bootstrap method in line with what has been stated above it is possible to obtain a CI for $\pi_{F_\gamma}(m)$ as a function of $\gamma$, on the basis of the point estimate $\pi_{F_\gamma^n}(m)$ and the distribution for $\pi_{F_\gamma^{n*}}(m)$.

Advantageously the method according to the invention may be applied to the control of a production process through statistical tests with one or more samples to determine the minimum number of products which have to be manufactured or selected from a batch of larger size in order to guarantee preestablished stability/sensitivity in the results of the statistical test.

Naturally, the principle of the invention remaining the same, the forms of embodiment and details of construction may be varied widely with respect to those described and illustrated, which have been given purely by way of example, without thereby departing from the scope of the invention, as defined by the appended claims.

What is claimed is:

1. A method for the control of an industrial process through an electronic processing system associated with a production line, including the performance of a statistical test $\Phi$ checking the properties of at least one group of products obtained through the process, whose power provides reproducibility/sensitivity information about the decision making outcome of the test, said method comprising:

producing at least one pilot sample including a plurality n of exemplars of the product obtained through said process, acquiring a plurality of measurement data $(X_1, ..., X_n)$ for at least one observed variable relating to said sample which is indicative of the properties of the product, the measured data relating to the pilot sample having a distribution $F''$ approximating to the unknown distribution F for the observed variable, determining a sample size on which the statistical test should be performed, said sample size being the minimum sample size such that the lower bound $$\left(\hat{\pi}_{F^n,l}^{\alpha 1}(m)\right)$$

of a confidence interval having a predetermined level $(1-\alpha 1)$ associated with the bootstrap distribution for the pointwise estimate of the power of the test performed on a sample of that size taken from the pilot sample having a distribution $F''$, is at least equal to or greater than a predetermined desired power value, and producing at least one sample of products to be subjected to said test $\Phi$, including a plurality m of exemplars equal to said sample size determined, the outcome of the test determining control of the process in accordance with a predetermined criterion.

2. A method according to claim 1, in which the distribution $F''$ is the estimated empirical distribution function for F derived from the measured data for the observed variable relating to the pilot sample.

3. A method according to claim 2, in which the $F''$ distribution is a smoothed empirical distribution function.

4. A method according to claim 1, in which the lower bound $$\hat{\pi}_{F^n,l}^{\alpha 1}(m)$$

of the power is determined as:

$$\hat{\pi}_{F^n,l}^{\alpha 1}(m) = 2\hat{\pi}_{F^n}(m) - \hat{\pi}_{F^{n*}}(m)_{(1-\alpha 1/2)}$$

where:

$\hat{\pi}_{F^n}(m)$ is the pointwise estimate of the power of the test; and $\hat{\pi}_{F^{n*}}(m)_{(1-\alpha 1/2)}$ represents the $1-\alpha 1/2^{-th}$ quantile of the distribution for $\hat{\pi}_{F^{n*}}(m)$, $F^{n*}$ being a generic element of the family of empirical distribution functions which can be obtained by the random extraction, with replacement, of n items of data from the n measurement data for the observed variable relating to the pilot sample.

5. A method according to claim 4, in which determination of the pointwise estimate of the power of the test when determining the lower bound $$\hat{\pi}_{F^n,l}^{\alpha 1}(m)$$

of the power comprises the following operations:

i) extracting a random sample $X_1^*, ..., X_m^*$ of size m, with replacements, from the pilot sample of size n available, ii) calculating the test $\Phi_\alpha(X_1^*, ..., X_m^*)$;

iii) repeating steps i) and ii) for a predetermined number of times, the percentage of tests having an outcome of 1 being the value of the pointwise estimate of the power of the test $\hat{\pi}_{F^n}(m)$.

6. A method according to claim 4, in which determination of the $1-\alpha1/2^{-th}$ quantile of the $\hat{\pi}_{F^n}*(m)$ distribution when determining the lower bound $$\hat{\pi}_{F^n,l}^{\alpha1}(m)$$

for the power comprises the following steps:
  i) extracting a random sample $X_1^*, \ldots, X_n^*$ of size n, with replacements, from the pilot sample of size n available,
  ii) extracting a random sample $(X_1^{}, \ldots, X_m^{})$ of size m, with replacements, from the $X_1^*, \ldots, X_n^*$ sample extracted in the preceding step,
  iii) calculating the test $\Phi(X_1^{}, \ldots, X_m^{})$
  iv) repeating steps ii) and iii) for a predetermined number of times, the percentage of tests $(\hat{\pi}_{F^{*}_j}(m))$ with an outcome of 1 being a point on the bootstrap distribution for the power of the test,
  v) repeating steps i)–iv) for a predetermined number J of times so as to obtain a plurality of points for the bootstrap distribution for the power of the test,
  vi) selecting the $J(1-\alpha1/2)^{th}$ of the said points ranked in increasing order as $\hat{\pi}_{F^n}*(m)_{(1-\alpha1/2)}$.

7. A method according to claim 6, in which the parameter $\alpha1$ which is representative for defining the degree of reliability of the confidence interval is first estimated from the measurement data acquired $(X_1, \ldots X_n)$, determination of the estimate of $\alpha1$ comprising the following steps:
  i) calculating the pointwise estimate for the power of the test $\hat{\pi}_{F^n}(m)$
  ii) calculating the bootstrap distribution $\hat{\pi}_{F^n}*(m)$ for the power of the test for a predetermined number of times and calculating the percentage number of times in which the relationship $\hat{\pi}_{F^n}*(m)_{(\alpha1')} > \hat{\pi}_{F^n}(m)$ is satisfied, $\alpha1'$ being a variable which is representative of the degree of reliability of the confidence interval having the predetermined initial value, whereby said calculated percentage constitutes a calibration value cal $(\alpha1')$,
  iii) repeating step ii) for a predetermined number of times increasing the variable $\alpha1'$ within the interval (0, 0.5),
  iv) interpolating the calibration values obtained in steps ii) and iii) to determine a calibration function cal($\alpha1'$) having a domain (0,0.5) and a codomain [0,1],
  v) selecting the value of $\text{cal}^{-1}(\alpha1)$ as an estimate of $\alpha1$.

8. A method according to claim 4, in which the lower bound for the power is determined as a function of a plurality of values for the sample size m starting from m=n.

9. A method according to claim 4, in which the lower bound for the power is determined as a function of a plurality of increasing values for the sample size m, starting from m=2.

10. A method according to claim 4, in which the upper bound $$\hat{\pi}_{F^n,u}^{\alpha1}(m)$$

for the power is determined as:

$$\hat{\pi}_{F^n,u}^{\alpha1}(m) = 2\hat{\pi}_{F^{n*}}(m) - \hat{\pi}_{F^{n*}}(m)_{(\alpha1/2)}$$

where:
  $\hat{\pi}_{F^n}*(m)_{(\alpha1/2)}$ represents the $\alpha1/2^{th}$ quantile for the $\hat{\pi}_{F^n}*(m)$ distribution.

11. A method according to claim 1, in which the lower bound $$\hat{\pi}_{F^n,l}^{\alpha1}(m)$$

for the power is determined as:

$$\hat{\pi}_{F^n,l}^{\alpha1}(m) = \hat{\pi}_{F^{n*}}(m)_{(\alpha1/2)}$$

where:
  $\hat{\pi}_{F^n}*(m)_{(\alpha1/2)}$ represents the $\alpha1/2^{th}$ quantile for the $\hat{\pi}_{F^n}*(m)$ distribution,
  $F^{n*}$ being a generic element in the family of empirical distribution functions which can be obtained by the random extraction of n data, with replacements, from the n measured data for the observed variable relating to the pilot sample.

12. A method according to claim 11, in which determination of the $\alpha1/2^{th}$ quantile for the $\hat{\pi}_{F^n}*(m)$ distribution when determining the lower bound $$\hat{\pi}_{F^n,l}^{\alpha1}(m)$$

for the power comprises the following operations:
  i) extracting a random sample $X_1^*, \ldots, X_n^*$ of size n, with replacements, from the pilot sample of size n available,
  ii) extracting a random sample $(X_1^{}, \ldots, X_m^{})$ of size m, with replacements, from the sample $X_1^*, \ldots, X_n^*$ extracted in the previous step,
  iii) calculating the test $\Phi(X_1^{}, \ldots, X_m^{})$
  iv) repeating steps ii) and iii) for a predetermined number of times, the percentage of tests $(\hat{\pi}_{F^{*}_j}(m))$ with an outcome of 1 being a point on the bootstrap distribution for the power of the test,
  v) repeating steps i)–iv) for a predetermined number J of times so as to obtain a plurality of points of the bootstrap distribution for the power of the test,
  vi) selecting the $J(\alpha1/2)^{th}$ of said points ranked in increasing order as $\hat{\pi}_{F^n}*(m)_{(\alpha1/2)}$.

13. A method according to claim 11, in which the lower bound $$\hat{\pi}_{F^n,l}^{\alpha1}(m)$$

for the power is determined as:

$$\hat{\pi}^{\alpha 1}_{F^n,l}(m) = \hat{\pi}_{F^{n*}}(m)_{(\alpha 1/2(BCa))}$$

where:

$\hat{\pi}_{F^n}*(m)_{(\alpha 1/2(BCa))}$ represents the $\alpha 1(BCa)/2^{th}$ quantile for the $\hat{\pi}_{F^n}*(m)$ distribution, $F^{n*}$ being a generic element in the family of empirical distribution functions which can be obtained by the random extraction of n data with replacements from the n measured data for the observed variable relating to the pilot sample, where $\alpha 1(BCa)$ is the value of $\alpha 1$ corrected in accordance with the Bias-Corrected and Accelerated bootstrap method.

14. A method according to claim 13, in which an upper bound $$\hat{\pi}^{\alpha 1}_{F^n,u}(m)$$

for the powers is determined as:

$$\hat{\pi}^{\alpha 1}_{F^n,u}(m) = \hat{\pi}_{F^n}*(m)_{(1-\alpha 1/2(BCa))}$$

where:

$\hat{\pi}_{F^n}*(m)_{(1-\alpha 1/2(Bca))}$ represents the $1-\alpha 1(BCa)/2^{th}$ quantile for the $\hat{\pi}_{F^n}*(m)$ distribution.

15. A method according to claim 11, in which an upper bound $$\hat{\pi}^{\alpha 1}_{F^n,u}(m)$$

for the power is determined as:

$$\hat{\pi}^{\alpha 1}_{F^n,u}(m) = \hat{\pi}_{F^{n*}}(m)_{(1-\alpha 1/2)}$$

where:

$\hat{\pi}_{F^n}*(m)_{(1-\alpha 1/2)}$ represents the $1-\alpha 1/2^{th}$ quantile for the $\hat{\pi}_{F^n}*(m)$ distribution.

16. A method according to claim 1, further comprising the following steps:

producing at least one further pilot sample of increased size in comparison with the preceding one and including the plurality of exemplars of the product in the preceding sample, determining an updated sample size on which to perform the statistical test on the basis of said further pilot sample, repeating the abovementioned operations until a predetermined convergence condition between the number of exemplars of the pilot sample and the estimated sample size for performance of the statistical test is achieved, and performing the $\Phi$ statistical test on the pilot sample of products so obtained.

17. A system for the control of an industrial process comprising an electronic processing system associated with a production line and arranged for acquiring a plurality of measurement data for at least one observed value relating to a sample of product obtained through said process and indicative of the properties of the product, and for performing a statistical test $\Phi$ verifying the properties of the product, programmed to implement a method in accordance with claim 1.

* * * * *